United States Patent
Adachi et al.

(10) Patent No.: US 9,438,793 B2
(45) Date of Patent: Sep. 6, 2016

(54) IMAGE FORMING APPARATUS, IMAGE FORMING METHOD AND IMAGE SENSOR

(71) Applicant: Panasonic Intellectual Property Management Co., Ltd., Osaka (JP)

(72) Inventors: Yasuhiko Adachi, Hyogo (JP); Yoshihide Sawada, Kyoto (JP); Yoshikuni Sato, Fukui (JP); Hideto Motomura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 19 days.

(21) Appl. No.: 14/628,035

(22) Filed: Feb. 20, 2015

(65) Prior Publication Data
US 2015/0163405 A1 Jun. 11, 2015

Related U.S. Application Data

(63) Continuation of application No. PCT/JP2014/002985, filed on Jun. 5, 2014.

(30) Foreign Application Priority Data

Jun. 7, 2013 (JP) .................................. 2013-121112

(51) Int. Cl.
*H04N 5/232* (2006.01)
*H04N 5/235* (2006.01)

(52) U.S. Cl.
CPC ........ *H04N 5/23232* (2013.01); *H04N 5/2354* (2013.01); *H04N 5/23229* (2013.01); *H04N 5/23245* (2013.01)

(58) Field of Classification Search
CPC ............ H04N 1/3935; H04N 3/1587; H04N 5/23232; H04N 5/23248; H04N 5/349; H04N 2201/0414; H04N 2201/0426; H04N 5/2354; H04N 5/23235; G06K 2009/2045
USPC ........................................ 348/218.1; 382/318
See application file for complete search history.

(56) References Cited

U.S. PATENT DOCUMENTS

2004/0247081 A1* 12/2004 Halsmer .................. A61B 6/00
378/108

(Continued)

FOREIGN PATENT DOCUMENTS

EP           0 889 644 A1    1/1999
JP        2000-295639 A    10/2000

(Continued)

OTHER PUBLICATIONS

International Search Report issued in PCT/JP2014/002985, dated Aug. 26, 2014, with English translation.
Co-pending U.S. Appl. No. 14/628,191, filed Feb. 20, 2015.

*Primary Examiner* — Nelson D. Hernández Hernández
(74) *Attorney, Agent, or Firm* — McDermott Will & Emery LLP

(57) ABSTRACT

An exemplary image forming apparatus includes: an illumination system which sequentially emits illuminating light beams from multiple different irradiation directions; an image sensor which captures a plurality of different images in the multiple different irradiation directions, respectively; an image processing section which forms a high-resolution image; and a memory which stores data about the ratio of light rays that have been incident on a photoelectric conversion section of each pixel of the image sensor to light rays that have passed through the upper surface of a plurality of subpixels included in the pixel with respect to each of the multiple irradiation directions. The image processing section forms the high-resolution image based on the data that has been retrieved from the memory by extracting, as a vector, a set of pixel values associated with the multiple irradiation directions from pixel values that form each of the plurality of images.

20 Claims, 35 Drawing Sheets

(56) References Cited

U.S. PATENT DOCUMENTS

| | | | |
|---|---|---|---|
| 2007/0035621 A1* | 2/2007 | Shimizu | G06T 3/4069 348/135 |
| 2007/0296829 A1 | 12/2007 | Nakamura et al. | |
| 2012/0082364 A1* | 4/2012 | Tani | G06T 7/408 382/133 |
| 2012/0092480 A1* | 4/2012 | Putman | H04N 5/349 348/79 |
| 2012/0098950 A1* | 4/2012 | Zheng | G02B 21/06 348/79 |
| 2012/0176489 A1* | 7/2012 | Oshiro | G02B 21/002 348/80 |
| 2013/0271593 A1* | 10/2013 | Tsujimoto | G09G 5/02 348/79 |

FOREIGN PATENT DOCUMENTS

| | | |
|---|---|---|
| JP | 2006-140885 A | 6/2006 |
| JP | 2012-185384 A | 9/2012 |
| WO | 98-30022 A1 | 7/1998 |

\* cited by examiner

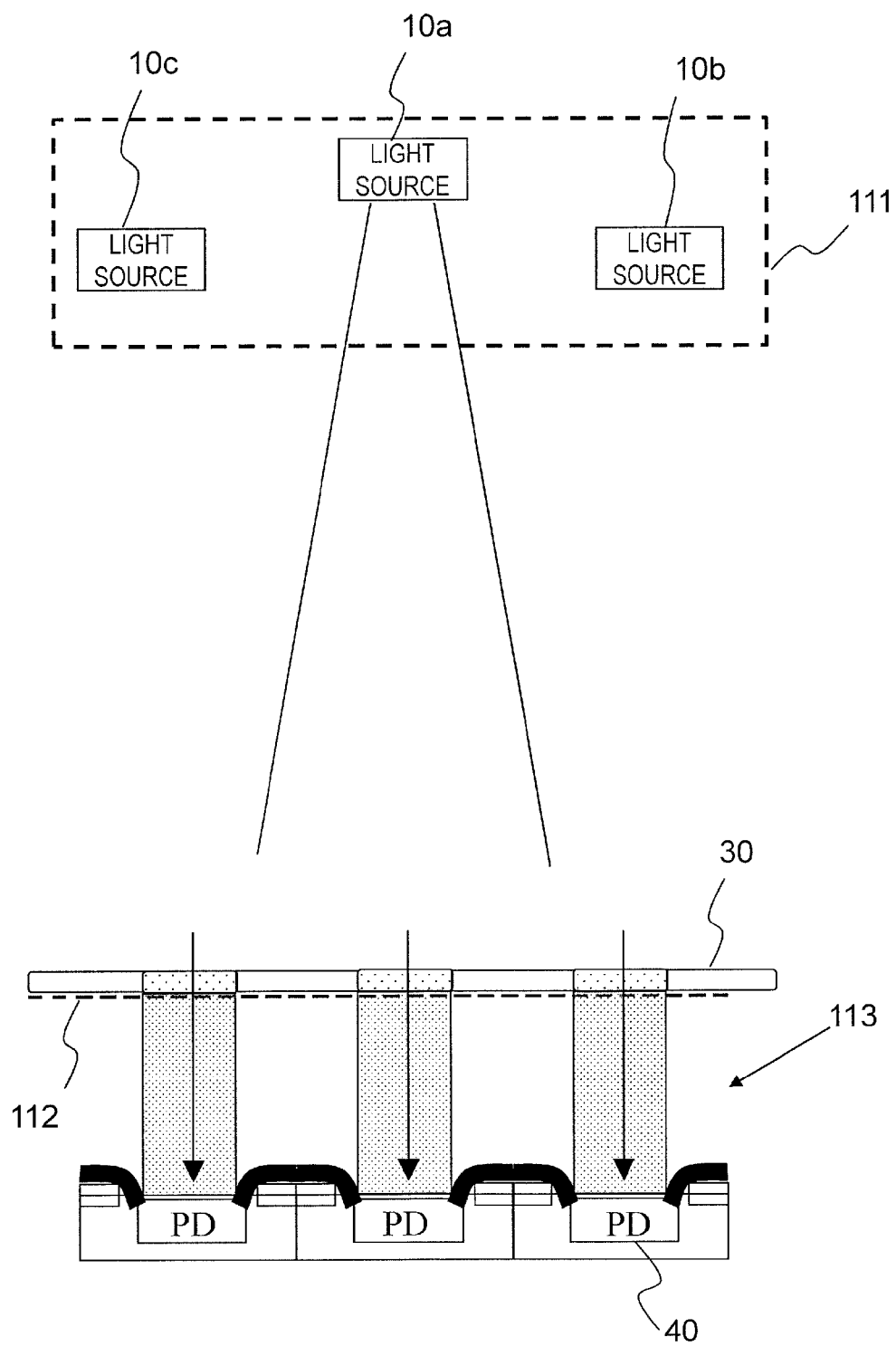

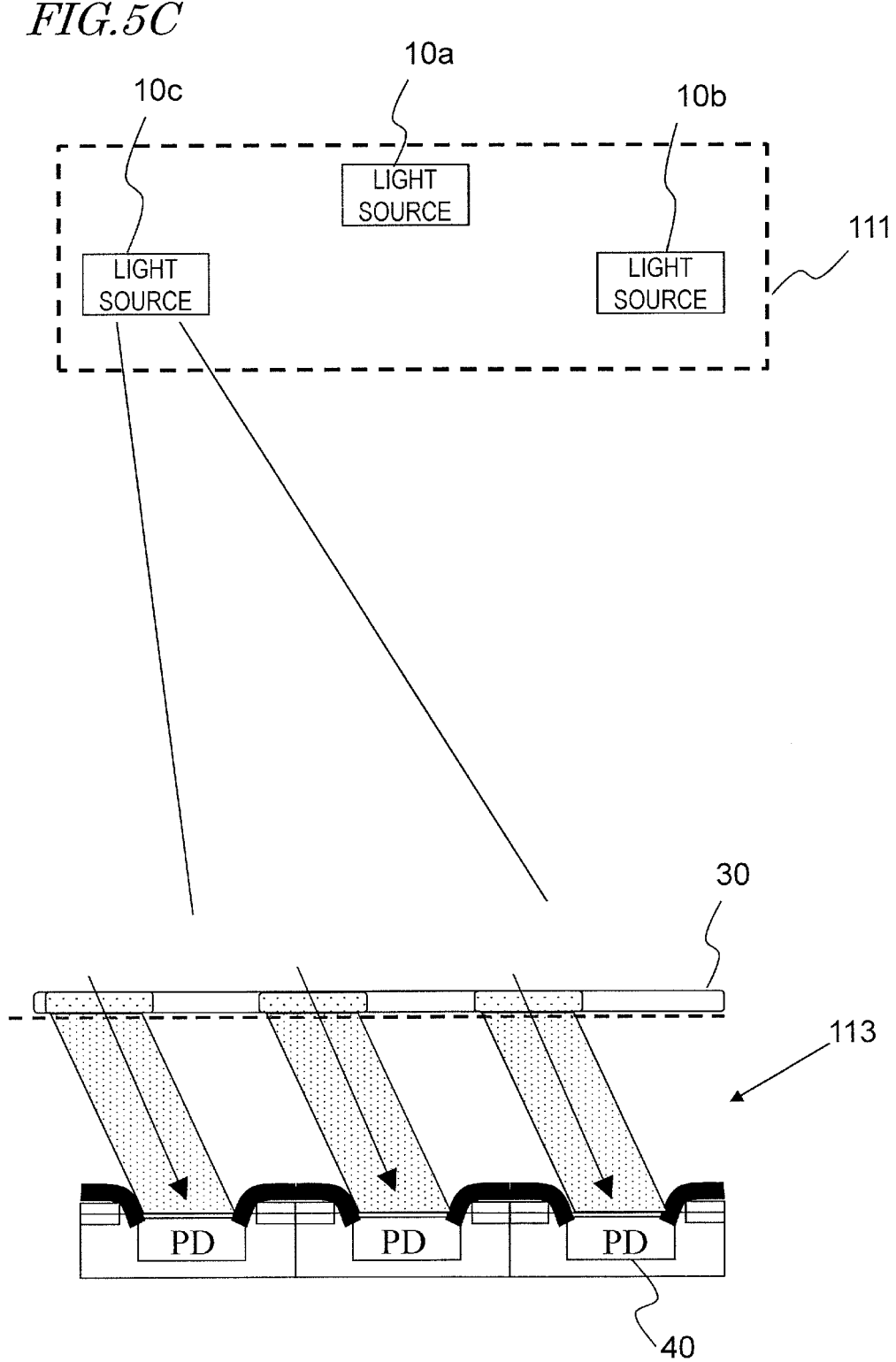

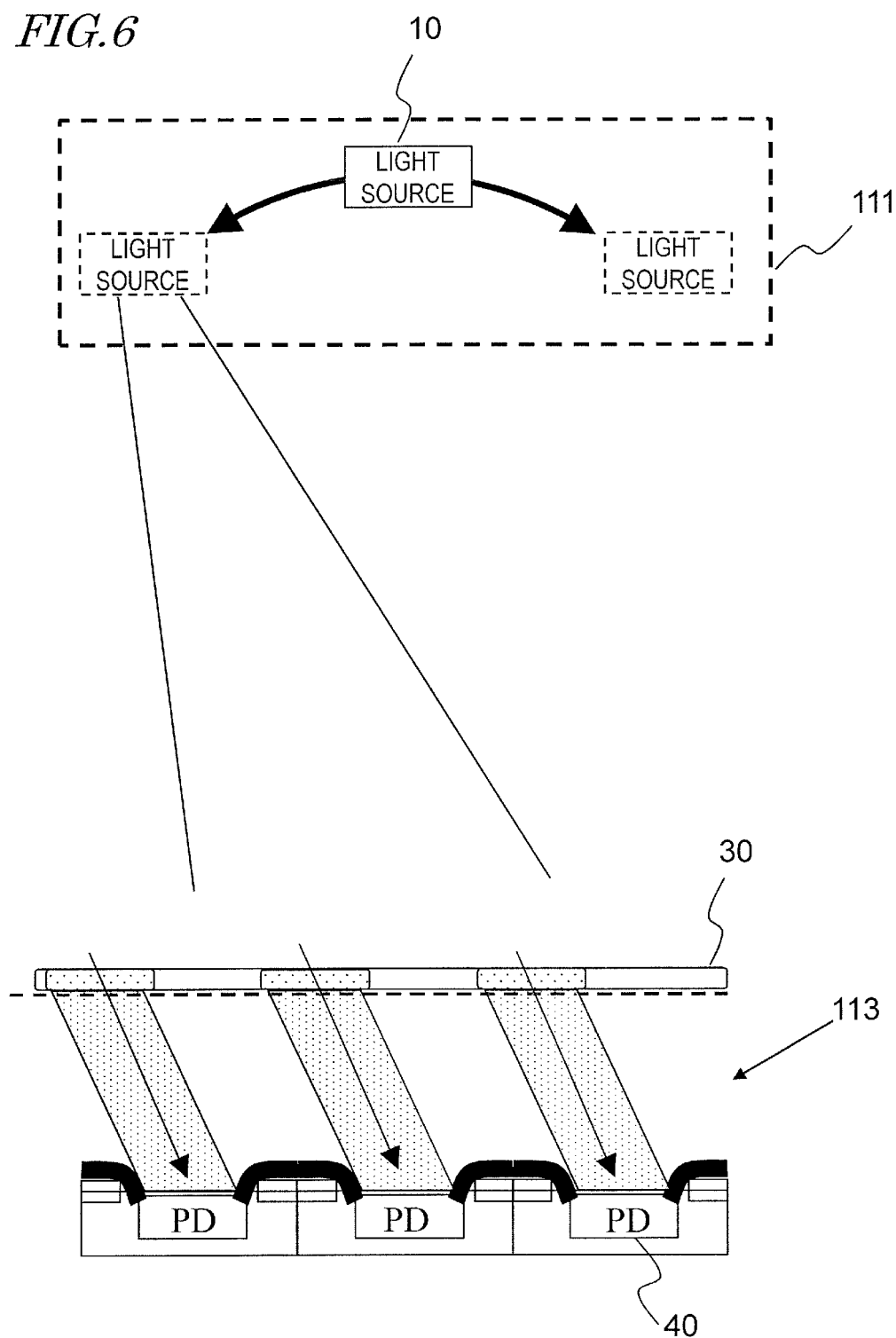

*FIG.12A*

| IRRADIATION DIRECTION | S₁ | S₂ | S₃ | S₄ |
|---|---|---|---|---|
| J1 | ½ | 1 | ½ | 0 |
| J2 | 1 | ½ | 0 | 0 |
| J3 | 0 | ½ | 1 | ½ |
| J4 | 0 | 0 | ½ | 1 |

| $A_1$ |
|---|
| $A_2$ |
| $A_3$ |
| $A_4$ |

| IRRADIATION DIRECTION | S₁ | ~ | S_(4N) |
|---|---|---|---|
| J1 | ½ | ~ | ½ |
| J2 | 1 | ~ | 0 |
| J3 | 0 | ~ | 1 |
| J4 | 0 | ~ | ½ |

| $A^k_1$ |
|---|
| $A^k_2$ |
| $A^k_3$ |
| $A^k_4$ |

| IRRADIATION DIRECTION | $S_1$ | $S_2$ | $S_3$ | $S_4$ | |
|---|---|---|---|---|---|
| J1 | ½ | 1 | ½ | 0 | $A_1$ |
| J2 | 1 | ½ | 0 | 0 | $A_2$ |
| J3 | 0 | ½ | 1 | ½ | $A_3$ |
| J4 | 0 | 0 | ½ | 1 | $A_4$ |
| J5 | ½ | 0 | 0 | 0 | $A_5$ |

*FIG.13B*

| IRRADIATION DIRECTION | $S_1$ | ~ | $S_{(4N)}$ | |
|---|---|---|---|---|
| J1 | ½ | ~ | ½ | $A^k_1$ |
| J2 | 1 | ~ | 0 | $A^k_2$ |
| J3 | 0 | ~ | 1 | $A^k_3$ |
| J4 | 0 | ~ | ½ | $A^k_4$ |
| J5 | ½ | ~ | 0 | $A^k_5$ |

*FIG.14*

| IRRADIATION DIRECTION | $S_1$ | $S_2$ | DATA OBTAINED |
|---|---|---|---|
| J1 | ½ | 1 | $A_1$ |
| J2 | 1 | ½ | $A_2$ |
| J3 | 0 | ½ | $A_3$ |

*FIG.15*

$$½ \cdot S_1 + S_2 = A_1 \ldots Eq1$$
$$S_1 + ½ \cdot S_2 = A_2 \ldots Eq2$$
$$0 \cdot S_1 + ½ \cdot S_2 = A_3 \ldots Eq3$$

IMAGE FORMING APPARATUS, IMAGE FORMING METHOD AND IMAGE SENSOR

This is a continuation of International Application No. PCT/JP2014/002985, with an international filing date of Jun. 5, 2014, which claims priority of Japanese Patent Application No. 2013-121112, filed on Jun. 7, 2013, the contents of which are hereby incorporated by reference.

BACKGROUND

1. Technical Field

The present application relates to an image forming apparatus, image forming method and image sensor.

2. Description of the Related Art

A two-dimensional image sensor in which a lot of photoelectric conversion sections are arranged in columns and rows within its imaging surface has been used as an image sensor for an image capture device. Each of those photoelectric conversion sections is typically a photodiode which has been formed on a semiconductor layer or on a semiconductor substrate, and generates electric charges based on the light incident thereon. The resolution of the two-dimensional image sensor depends on the arrangement pitch or density of the photoelectric conversion sections on the imaging surface. However, since the arrangement pitch of the photoelectric conversion sections has become almost as short as the wavelength of visible radiation, it is very difficult to further increase the resolution.

An image captured by the image sensor is comprised of a lot of pixels, each of which is defined by a unit region including a single photoelectric conversion section. Since there is an area to be occupied by wiring on the imaging surface, the photosensitive area R2 of a single photoelectric conversion section is smaller than the area R1 of a single pixel. The ratio (R2/R1) of the photosensitive area R2 to the area R1 of each pixel is called an "aperture ratio", which may be approximately 25%, for example. If the aperture ratio is low, the amount of light that can be used for photoelectric conversion decreases, and therefore, the quality of a pixel signal to be output by the image sensor declines. However, by adopting a configuration in which an array of micro lenses is arranged to face the imaging surface and in which each of those micro lenses faces, and converges light onto, its associated photoelectric conversion section, the photosensitive area R2 can be increased so effectively that the aperture ratio (R2/R1) can be raised to the vicinity of one. Nevertheless, even if the aperture ratio (R2/R1) is increased in this manner, the arrangement pitch and arrangement density of pixels do not increase, and therefore, the resolution does not change.

Japanese Laid-Open Patent Publication No. 2006-140885 discloses how to increase the resolution by super-resolution technique. To increase the resolution by such a technique, restoration needs to be done by deconvolution, and therefore, a point spread function (PSF) should be obtained. For example, to determine the PSF actually, a dotted light source needs to be used. That is why it has been proposed that the PSF be obtained using quantum dots or fluorescence beads.

However, it is difficult to obtain the PSF accurately. In addition, since the magnitude of the PSF is proportional to the zoom power of shooting, the measuring error of the PSF increases proportionally to the zoom power of shooting. As a result, the quality of the high-resolution image deteriorates proportionally to the resolution.

SUMMARY

One non-limiting, and exemplary embodiment provides a technique to achieve higher resolution.

In one general aspect, an image forming apparatus disclosed herein includes: an illumination system which sequentially emits illuminating light beams from multiple different irradiation directions with respect to an object and irradiates the object with the illuminating light beams; an image sensor which is arranged at a position where the illuminating light beams that have been transmitted through the object are incident and which captures a plurality of different images in the multiple different irradiation directions, respectively; an image processing section which forms a high-resolution image of the object, having a higher resolution than any of the plurality of images, based on the plurality of images; and a memory which stores data about the ratio of light rays that have been incident on a photoelectric conversion section of each pixel of the image sensor to light rays that have passed through the upper surface of a plurality of subpixels included in the pixel with respect to each of the multiple irradiation directions. The image processing section forms the high-resolution image of the object based on the data that has been retrieved from the memory by extracting, as a vector, a set of pixel values associated with the multiple irradiation directions from pixel values that form each of the plurality of images.

According to embodiments of the present disclosure, the resolution can be increased by synthesizing together a plurality of low-resolution images that have been captured by a single image sensor.

These general and specific aspects may be implemented using a system, a method, a computer program, a computer-readable recording medium, and an image sensor, and any combination of systems, methods, computer programs, computer-readable recording media, and image sensors.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 5A illustrates an exemplary illumination unit for an image forming apparatus according to the present disclosure.

FIG. 5C illustrates still another exemplary illumination unit for an image forming apparatus according to the present disclosure.

FIG. 6 illustrates yet another exemplary illumination unit for an image forming apparatus according to the present disclosure.

FIG. 12A is a table summarizing relations between the output values $A_1$ to $A_4$ of a photodiode 40 and transmittances $S_1$ to $S_4$ which were obtained by capturing images in respective irradiation directions J1 to J4.

FIG. 12B is a table summarizing relations between the output values of a photodiode 40 and transmittances $S_1$ to $S_4$ which were obtained by capturing images in respective irradiation directions J1 to J4 with respect to N pixels.

FIG. 13A is a table summarizing relations between the output values $A_1$ to $A_5$ of a photodiode 40 and transmittances $S_1$ to $S_4$ which were obtained by capturing images in respective irradiation directions J1 to J5.

FIG. 13B is a table summarizing relations between the output values of a photodiode 40 and transmittances $S_1$ to $S_4$ which were obtained by capturing images in respective irradiation directions J1 to J5 with respect to N pixels.

FIG. 14 is a table summarizing relations between the output values $A_1$ to $A_3$ of a photodiode 40 and transmittances $S_1$ and $S_2$ which were obtained by capturing images in respective irradiation directions J1 to J3.

FIG. 15 shows conditional expressions defining the relations shown in FIG. 14.

DETAILED DESCRIPTION

Before embodiments of an image forming apparatus according to the present disclosure are described, an exemplary basic configuration for an image sensor will be described.

Figure 1:
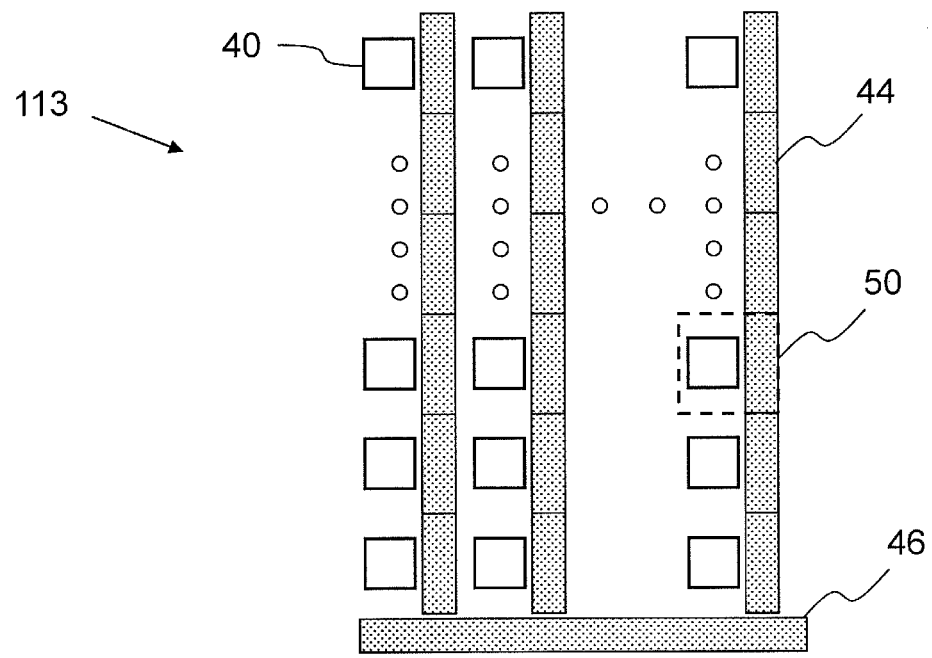
FIG. 1 is a plan view schematically illustrating an exemplary arrangement of photodiodes in an image sensor.

FIG. 1 is a plan view schematically illustrating a portion of the imaging surface of a CCD image sensor which is an exemplary image sensor 113. As shown in FIG. 1, a number of photodiodes (photoelectric conversion sections) 40 are arranged in columns and rows on the imaging surface. In FIG. 1, a single pixel 50 is indicated by the dotted rectangle. On the imaging surface, a lot of pixels 50 are densely arranged in columns and rows.

The light that has been incident on each photodiode 40 generates electric charges inside the photodiode 40. The amount of the electric charges generated varies according to the amount of the light that has been incident on that photodiode 40. The electric charges generated by each photodiode 40 move to, and are sequentially transferred through, a vertical charge transfer path 44 which runs vertically to enter a horizontal charge transfer path 46. Next, the electric charges are transferred through the horizontal charge transfer path 46 which runs horizontally and are output as a pixel signal to a device outside of this image sensor 113 through one end of the horizontal charge transfer path 46. Although not shown, transfer electrodes are arranged on these charge transfer paths 44 and 46. It should be noted that the image sensor 113 for use in an image forming apparatus according to the present disclosure does not have to have this configuration. For example, the CCD image sensor may be replaced with an MOS image sensor.

In the imaging surface, the vertical arrangement pitch of the photodiodes 40 does not have to agree with their horizontal arrangement pitch. In this description, however, the vertical and horizontal arrangement pitches of the photodiodes 40 are supposed to be equal to each other and are both supposed to be K [µm] for the sake of simplicity.

Figure 2:
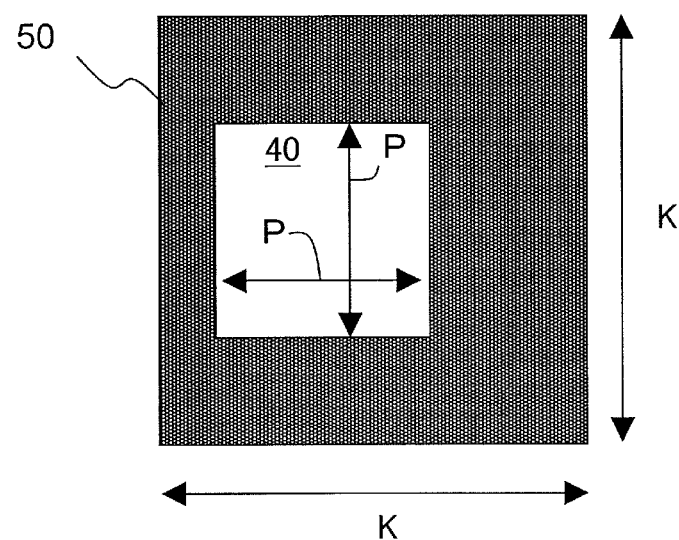
FIG. 2 is a plan view schematically illustrating the relation between a single pixel and an aperture area in an image sensor.

FIG. 2 is a plan view schematically illustrating a single pixel 50 and a photodiode 40 included in the pixel 50. In this example, the size of each pixel is K [µm]×K [µm], and the size of the photodiode 40 (i.e., the size of its photosensitive area) is P [µm]×p [µm]. Thus, the area of a single pixel is given by R1=K×K and the area of a single photodiode 40 is given by R2=P×P (where "×" denotes multiplication). It should be noted that the resolution is determined in this embodiment by the size of the photodiode 40 (i.e., the size of its photosensitive area), not by the pixel pitch. Considering the wavelength of visible radiation for use as illuminating light, however, the size P of the photodiode 40 according to this embodiment may be set to be equal to or greater than 0.1 µm.

In the image forming apparatus of the present disclosure, no micro lenses are provided for each photodiode 40. That is why the rest of each pixel 50 other than the photosensitive area (i.e., the area with the size P×P) of the photodiode 40 is an opaque area. The light incident on the opaque area is not converted into electric charge and does not generate any pixel signal, either. The photosensitive area indicated by P [µm]×P [µm] may be called an "aperture area". The location, shape and size of the photodiode 40 in each pixel 50 do not have to be the exemplary ones illustrated in FIG. 2.

The pixel region and photodiode typically have a rectangular shape on the imaging surface. In that case, supposing n and m are real numbers, the ratio of the photodiode's size to the pixel region's size as measured horizontally in the imaging surface can be represented by (1/n), and the ratio of the photodiode's size to the pixel region's size as measured vertically in the imaging surface can be represented by (1/m). Then, the aperture ratio can be represented by (1/n)×(1/m), where n and m may both be real numbers which are equal to or greater than two.

Figure 3:
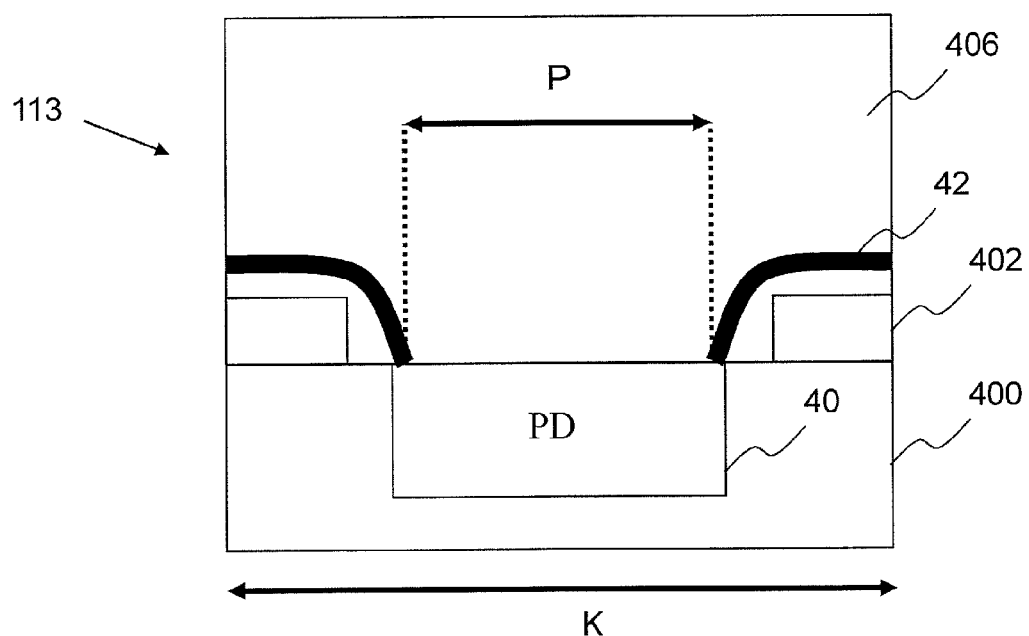
FIG. 3 is a cross-sectional view schematically illustrating the relation between a single pixel and an aperture area in an image sensor.

FIG. 3 is a cross-sectional view schematically illustrating an exemplary cross-sectional structure for a single pixel 50 included in the image sensor 113. As shown in FIG. 3, the image sensor includes a semiconductor substrate 400, a photodiode (PD) 40 which has been formed on the surface of the semiconductor substrate 400, an interconnect layer 402 supported on the semiconductor substrate 400, an opaque layer 42 which covers the interconnect layer 402, and a transparent layer 406 which covers the light incident side of the semiconductor substrate 400. Since FIG. 3 illustrates a cross section of a portion corresponding to a single pixel, only one photodiode 40 is shown in FIG. 3. Actually, however, a huge number of photodiodes 40 are arranged on the single semiconductor substrate 400. If the image sensor 113 is a CCD image sensor, a doped layer (not shown) functioning as a vertical or horizontal charge transfer path is provided under the interconnect layer 402 in the semiconductor substrate 400. The interconnect layer 402 is connected to an electrode (not shown) which is arranged on the charge transfer path. If the image sensor 113 is an MOS image sensor, MOS transistors (not shown) are arranged on a pixel-by-pixel basis on the semiconductor substrate 400. Each of those MOS transistors functions as a switching element to extract electric charges from its associated photodiode 40.

Every component of the image sensor 113 but the photodiode 40 is covered with the opaque layer 42. In the example illustrated in FIG. 3, the region covered with the opaque layer 42 is filled in black.

The image sensor for use in this embodiment does not have to have such a configuration but may also be a CCD or MOS image sensor of a backside illumination type, for example.

Next, an exemplary general configuration for an image forming apparatus according to the present disclosure will be described with reference to FIGS. 4A and 4B.

Figure 4A:
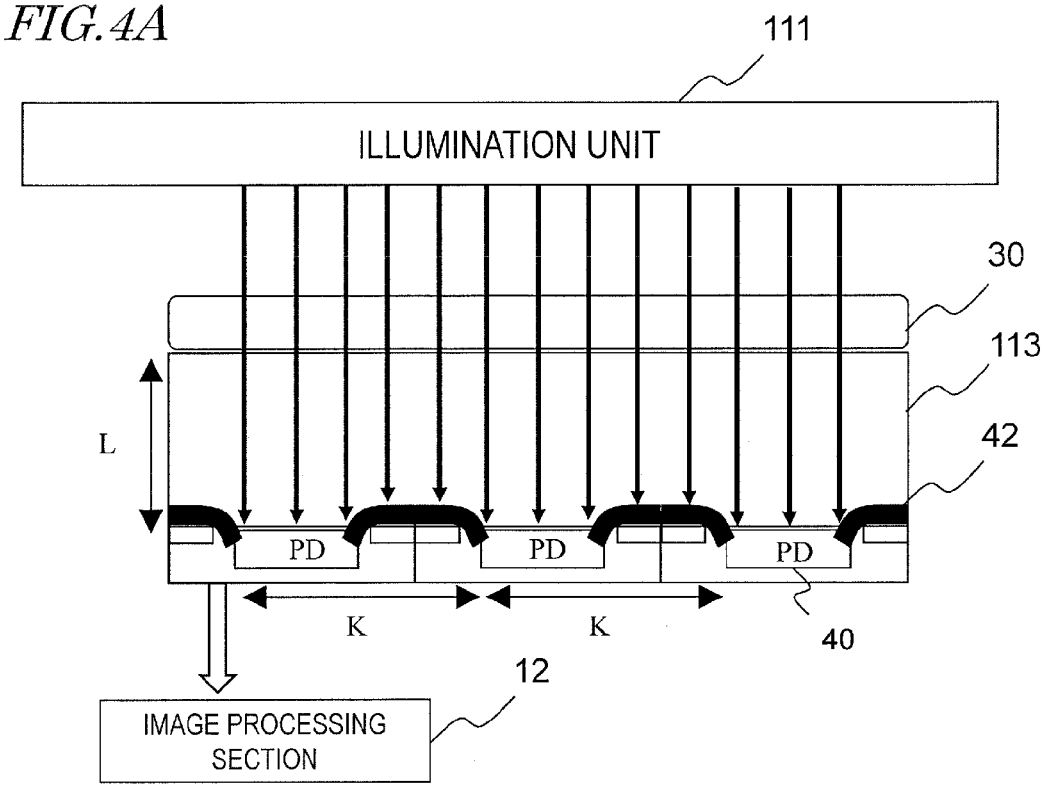
FIG. 4A is a cross-sectional view schematically illustrating an exemplary configuration and operation of an image forming apparatus according to the present disclosure.
Figure 4B:
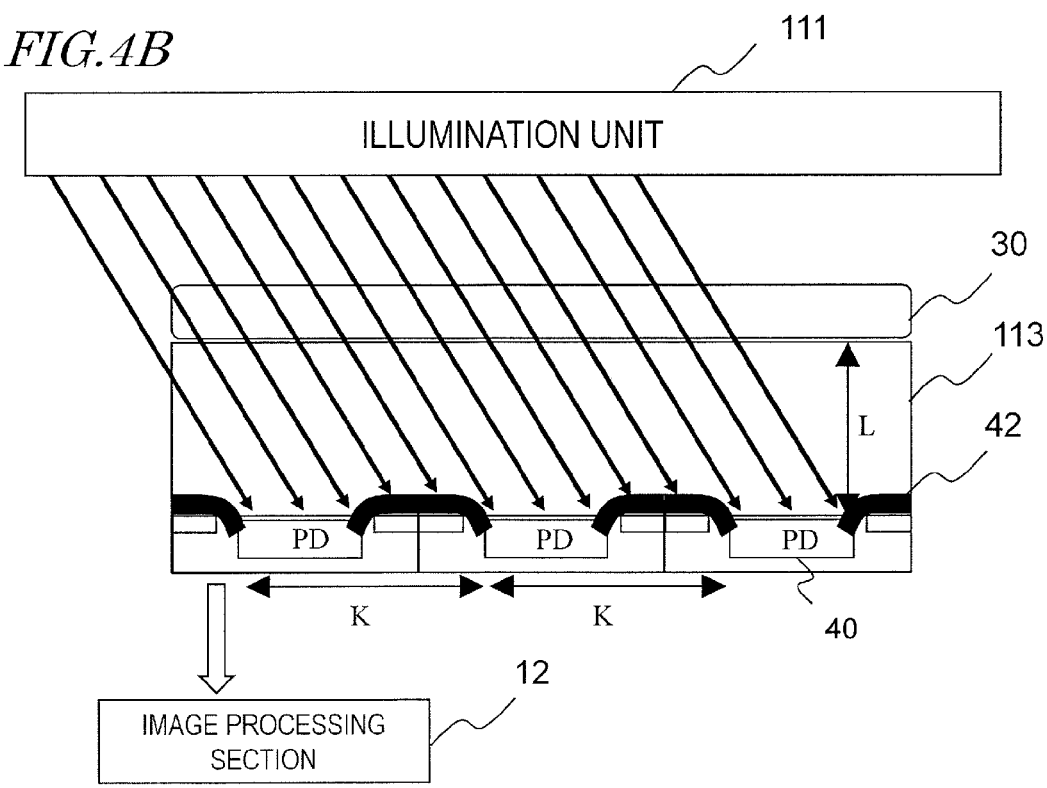
FIG. 4B is a cross-sectional view schematically illustrating an exemplary configuration and operation of an image forming apparatus according to the present disclosure.

The image forming apparatus illustrated in FIGS. 4A and 4B includes an illumination unit 111 which sequentially emits illuminating light beams from multiple different light source directions (irradiation directions) with respect to an object 30 and irradiates the object 30 with the illuminating light beams, and an image sensor 113 which is arranged at a position where the illuminating light beams that have been transmitted through the object 30 are incident and which captures a plurality of different images in the multiple different irradiation directions, respectively. This image forming apparatus further includes an image processing section 12 which forms a high-resolution image based on the plurality of images that have been captured in the multiple different irradiation directions. This image processing section 12 can form a high-resolution image of the object which has a higher resolution than any of the plurality of images provided by the image sensor 113. The image processing section 12 may be implemented as either a general-purpose computer or a dedicated computer.

When the image sensor 113 is going to capture a first image (see FIG. 4A), the illuminating unit 111 makes an illuminating light beam incident on the object 30 from a first direction. On the other hand, when the image sensor 113 is going to capture a second image (see FIG. 4B), the illuminating unit 111 makes an illuminating light beam incident on the object 30 from a second direction. Among the light rays illustrated in FIGS. 4A and 4B, the ones incident on the opaque layer 42 are not used to capture any image. In other words, only the light rays that have been incident on the photodiode 40 are used to capture images among the light rays that have been emitted from the illuminating unit 111.

If the direction in which an incoming light ray is incident on the object 30 changes significantly, the light ray may have been transmitted through different regions of the object 30 before being incident on the photodiode 40. In the image forming apparatus of this embodiment, however, the plurality of irradiation directions may be adjusted so that while the image sensor 113 is capturing a plurality of images, at least some of the light rays that have been transmitted through the same portion of the object 30 are incident on the photoelectric conversion section of the image sensor 113. It should be noted that the object 30 that can be shot by the image forming apparatus of the present disclosure is a matter, at least a part of which is a region that can transmit a light ray. For example, the object 30 may be a slide plate including a pathological sample with a thickness of several µm. The object 30 does not have to have a plate shape but may also be powder or liquid as well. When measured along a normal to the imaging surface, the object 30 may have a size of 2 µm or less, for example.

Next, a first exemplary configuration for the illumination unit 111 will be described with reference to FIGS. 5A, 5B and 5C.

The illumination unit 111 with this first exemplary configuration includes a plurality of light sources (illuminating light sources) 10a, 10b and 10c, which are arranged at respectively different positions corresponding to multiple different irradiation directions and are turned ON sequentially. For example, when the light source 10a is turned ON, light is emitted from the light source 10a and irradiates the object 30 as shown in FIG. 5A. In FIGS. 5A to 5C, the light emitted from the light sources 10a, 10b and 10c is illustrated as if the light was diverging. Actually, however, the distances from the light sources 10a, 10b and 10c to the image sensor 113 are so long that the light incident on the object 30 and image sensor 113 may be regarded as substantially parallel. Optionally, the light radiated from the light sources 10a, 10b and 10c may also be converged by an optical system such as a lens (not shown) into a parallel light beam or a quasi-parallel light beam. That is why the light sources 10a, 10b and 10c may be either point light sources or surface-emitting light sources. The object 30 is put on the upper surface of the image sensor 113. The upper surface of the image sensor 113 is indicated by the dashed line in FIG. 5A and functions as an object supporting portion 112.

First, an image is captured by the image sensor 113 while the object 30 is irradiated with the light emitted from the light source 10a. Next, the light source 10b, for example, is turned ON and the light sources 10a and 10c are turned OFF. In this case, light is emitted from the light source 10b and irradiates the object 30 as shown in FIG. 5B. In such a state, an image is captured by the image sensor 113 while the object 30 is irradiated with the light emitted from the light source 10b. Next, the light source 10c is turned ON and the light sources 10a and 10b are turned OFF. In this case, light is emitted from the light source 10c and irradiates the object 30 as shown in FIG. 5C. In such a state, another image is captured by the image sensor 113.

Figure 5B:
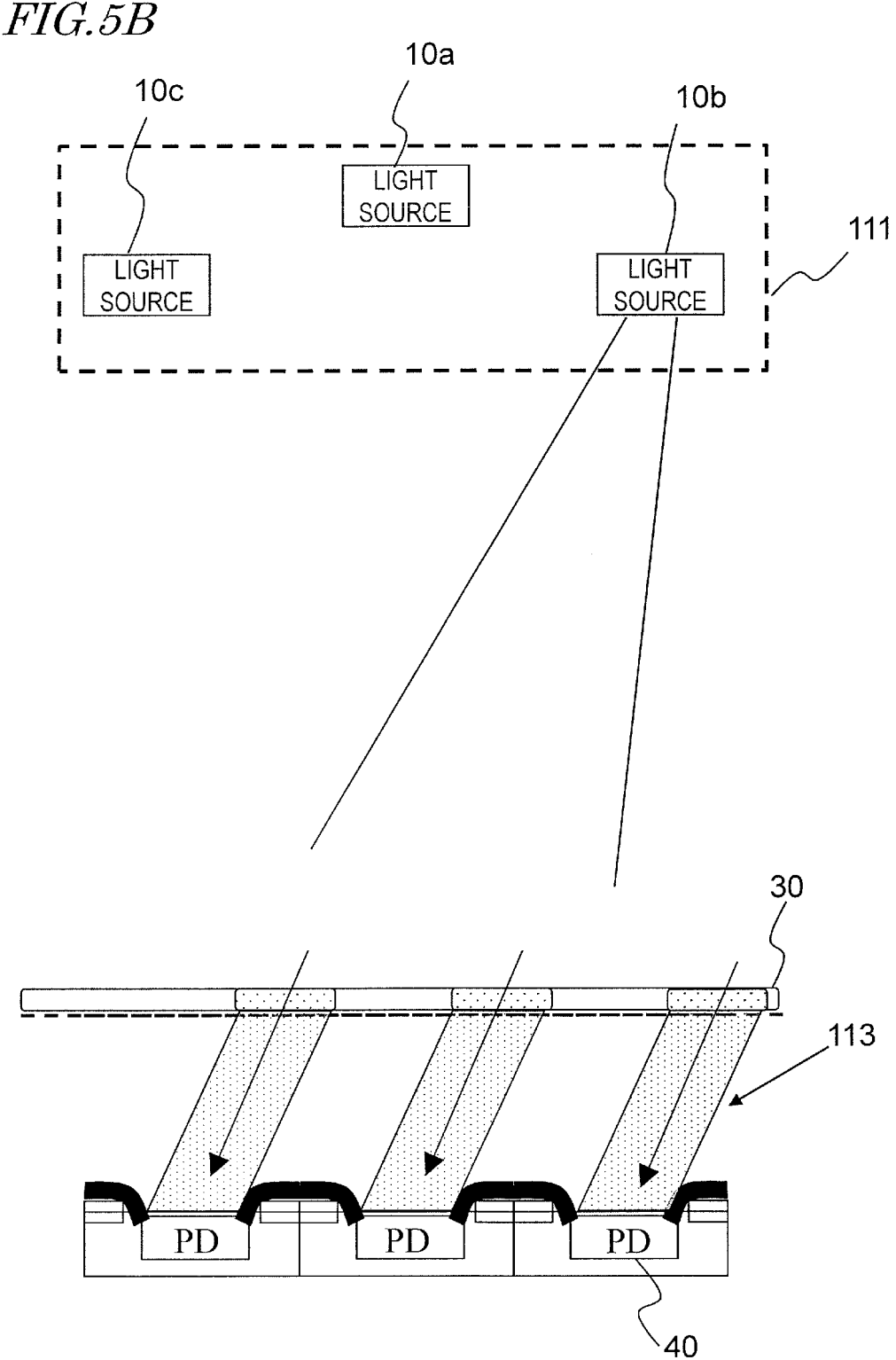
FIG. 5B illustrates another exemplary illumination unit for an image forming apparatus according to the present disclosure.

In the examples illustrated in FIGS. 5A to 5C, the object 30 is irradiated with light beams coming from three different irradiation directions, and an image is captured every time the object 30 is irradiated with a light beam. Thus, three images are captured in total. However, the number of light sources that the illumination unit 111 has does not have to be three. Optionally, multiple light sources with respectively different emission wavelengths may be arranged close to each other in the same irradiation direction. For example, if light sources which emit red, green and blue light beams (which will be hereinafter referred to as "RGB light sources") are arranged at and near the position of the light source 10a shown in FIG. 5A, three images can be captured by sequentially radiating the red, green and blue light beams in the state shown in FIG. 5A. And once those three images are captured, a full-color image can be obtained just by superposing those images one upon the other. These images are time-sequential color images. In this case, if the RGB light sources are turned ON simultaneously, these light sources can function as a single white light source. Also, if color filters are provided for the image sensor, a white light source may be used as the light source.

It should be noted that the wavelength of the light sources that the illumination unit 111 has does not have to fall within the visible radiation range but may also fall within the infrared or ultraviolet range as well. Alternatively, white light may be emitted from each of those light sources. Still alternatively, cyan, magenta and yellow light beams may be emitted from those light sources.

Next, look at FIG. 6, which schematically illustrates a second exemplary configuration for the illumination unit 111. In the exemplary configuration shown in FIG. 6, the illumination unit 111 includes at least one light source 10 which is supported so as to be movable to any direction. By moving this light source 10, light can be emitted from any of multiple irradiation directions and can irradiate the object 30.

It should be noted that even in the examples illustrated in FIGS. 5A to 5C, the light sources 10a, 10b and 10c do not have to be fixed at particular positions but may also be supported movably. Alternatively, a light beam emitted from a single fixed light source 10 may have its optical path changed by an actuated optical system such as a movable mirror so as to be incident on the object 30 from a different direction.

In the examples illustrated in FIGS. 5A to 5C and in the example illustrated in FIG. 6, the irradiation direction is supposed to change within a plane which is parallel to the paper. However, the irradiation direction may also define a tilt angle with respect to that plane. In the following description, however, zooming (i.e., resolution enhancement) along one-dimensional direction on the imaging surface will be described for the sake of simplicity. In 2-dimensional resolution enhancement, If the intended zoom power is n (where n is an integer that is equal to or greater than two), $n^2$ light sources may be used, for example.

It should be noted that the "irradiation direction" of illuminating light is determined by the relative arrangement of its light source with respect to the object (or imaging surface). In this description, the imaging surface is regarded as a reference plane and the direction from which an illuminating light ray has come before being incident on the imaging surface is defined to be the "irradiation direction". Supposing the horizontal and vertical directions on the imaging surface are X and Y axes, respectively, and a normal to the imaging surface is Z axis, the irradiation direction may be determined by a vector in the XYZ coordinate system. The irradiation direction may be an arbitrary one, so is the number of irradiation directions.

The irradiation direction that is perpendicular to the imaging surface may be represented by the vector (0, 0, 1). If the interval between the imaging surface and the object is L, sixteen different irradiation directions θ1 through θ16 may be represented by the vectors (0, 0, L), (K/4, 0, L), (2K/4, 0, L), (3K/4, 0, L), (0, K/4, L), (K/4, K/4, L), (2K/4, K/4, L), (3K/4, K/4, L), (0, 2K/4, L), (K/4, 2K/4, L), (2K/4, 2K/4, L), (3K/4, 2K/4, L), (0, 3K/4, L), (K/4, 3K/4, L), (2K/4, 3K/4, L) and (3K/4, 3K/4, L), respectively. Another angle at which the same images can be captured may also be adopted.

Next, the directions in which the illuminating light beams are incident will be described with reference to FIGS. 7 to 9, in each of which shown is a light beam incident on a photodiode 40 of interest.

Figure 7:
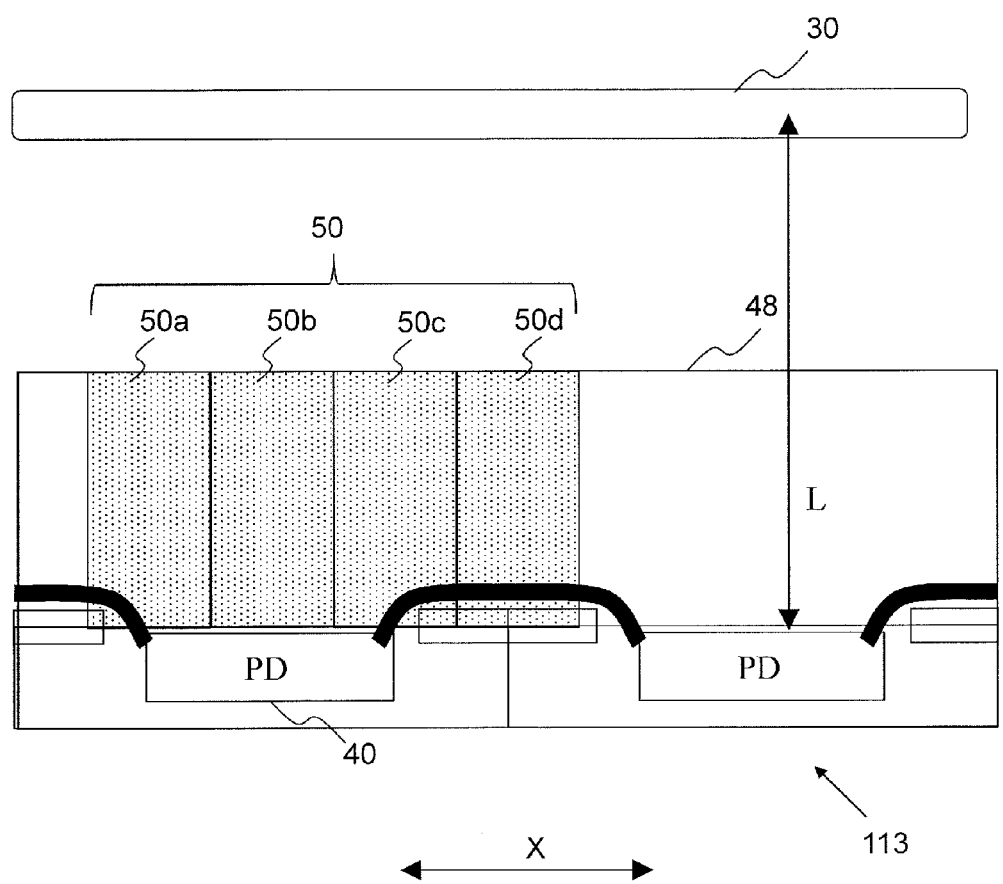
FIG. 7 is a cross-sectional view illustrating how a light ray may be incident on an image sensor according to the present disclosure.

First of all, look at FIG. 7. To illustrate the principle of resolution enhancement, each pixel of the image sensor 113 is supposed to include a plurality of subpixels. The number of subpixel regions is not unique to the structure of the image sensor 113 but may be set based on the number of times the object is irradiated with light beams with its irradiation direction changed while images are captured. In the example illustrated in FIG. 7, a single pixel 50 includes four subpixels 50a, 50b, 50c, and 50d. Since a single pixel includes a single photodiode 40, information about fine regions associated with those subpixels 50a, 50b, 50c, and 50d cannot be obtained individually from the object 30 in a normal image capturing session. That is to say, in this description, the "plurality of subpixels included in each pixel of the image sensor" refers herein to multiple divisions of a single pixel region allocated to each photodiode of the image sensor.

The object 30 may be arranged either in contact with, or close to, the upper surface 48 of the image sensor 113 while images are captured. Thus, the upper surface 48 of the image sensor 113 can function as an object supporting portion (object supporting surface). Among the respective surfaces of the subpixels 50a, 50b, 50c, and 50d, their surface that forms part of the upper surface 48 of the image sensor 113 is defined herein to be the "subpixel's upper surface".

In the example illustrated in FIG. 7, four subpixels 50a, 50b, 50c, and 50d are arranged in a single pixel 50 along the X axis shown in FIG. 7. However, the subpixels may be arranged in any other arbitrary pattern. For example, the subpixels may be arranged two-dimensionally according to the spread of the imaging surface. In this example, each pixel is supposed to be comprised of four subpixels which are arranged one-dimensionally in the X-axis direction for the sake of simplicity, and attention is paid to only one pixel.

Next, it will be described with reference to FIGS. 8 to 10 how the percentage of an illuminating light ray that has been transmitted through the upper surface of a subpixel 50a, 50b, 50c or 50d and then incident on the photodiode 40 changes with the direction from which that illuminating light ray has come (i.e., with its irradiation direction). In the state illustrated in FIGS. 8 to 10, the object 30 has not been put on the image sensor 113 yet.

Figure 8:
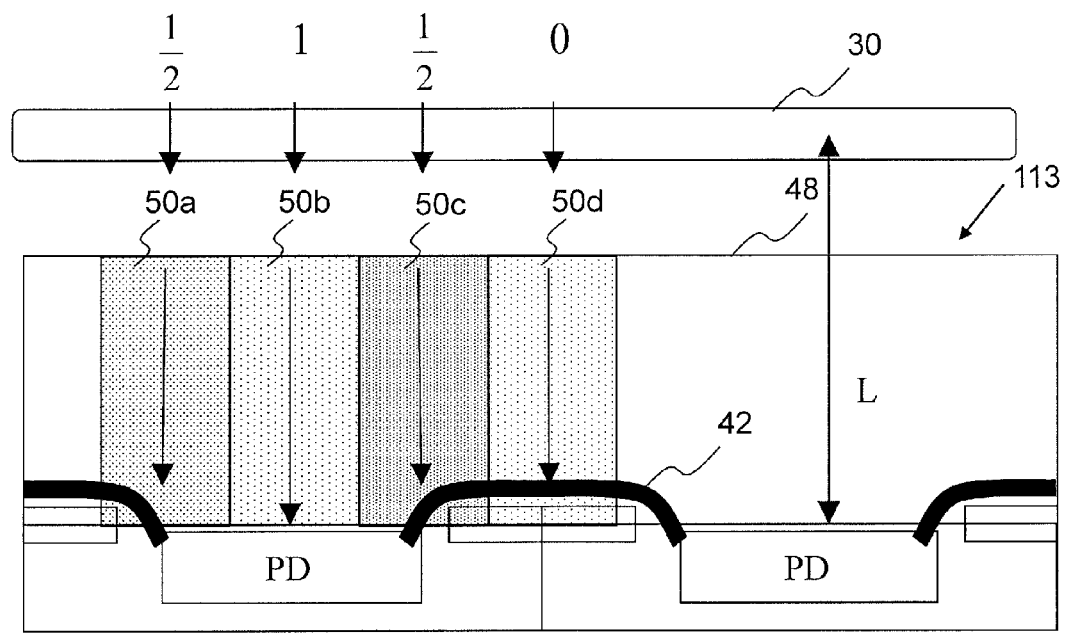
FIG. 8 is a cross-sectional view illustrating how light rays may also be incident on an image sensor according to the present disclosure.

In FIG. 8, the illuminating light rays are incident perpendicularly onto the imaging surface. Such illuminating light rays are obtained by irradiating the image sensor 113 with the light emitted from the light source 10a shown in FIG. 5A, for example. In this case, the light rays that have been transmitted through the respective upper surfaces of the subpixels 50a, 50b, 50c and 50d are incident on the photodiode 40 at ratios of ½, 1, ½ and 0, respectively. For example, supposing the amount of light transmitted through the upper surface of the subpixel 50b and incident on the photodiode 40 is the unity (i.e., one), the amount of light transmitted through the upper surface of the subpixel 50a and incident on the photodiode 40 is ½. A half of the light transmitted through the upper surface of the subpixel 50c is incident on the photodiode 40, while the other half is incident on an opaque layer 42. And all of the light transmitted through the upper surface of the subpixel 50d is incident on the opaque layer 42, not on the photodiode 40. It should be noted that the numerical values "½, 1, ½ and 0" defining the ratios described above are only an example. Alternatively, the ratios may be represented either by common fractions which use an integer of 3 or more or by decimal fractions. If the image sensor 113 has a different structure (e.g., if the image sensor 113 has a different aperture ratio), these ratios may change.

Figure 9:
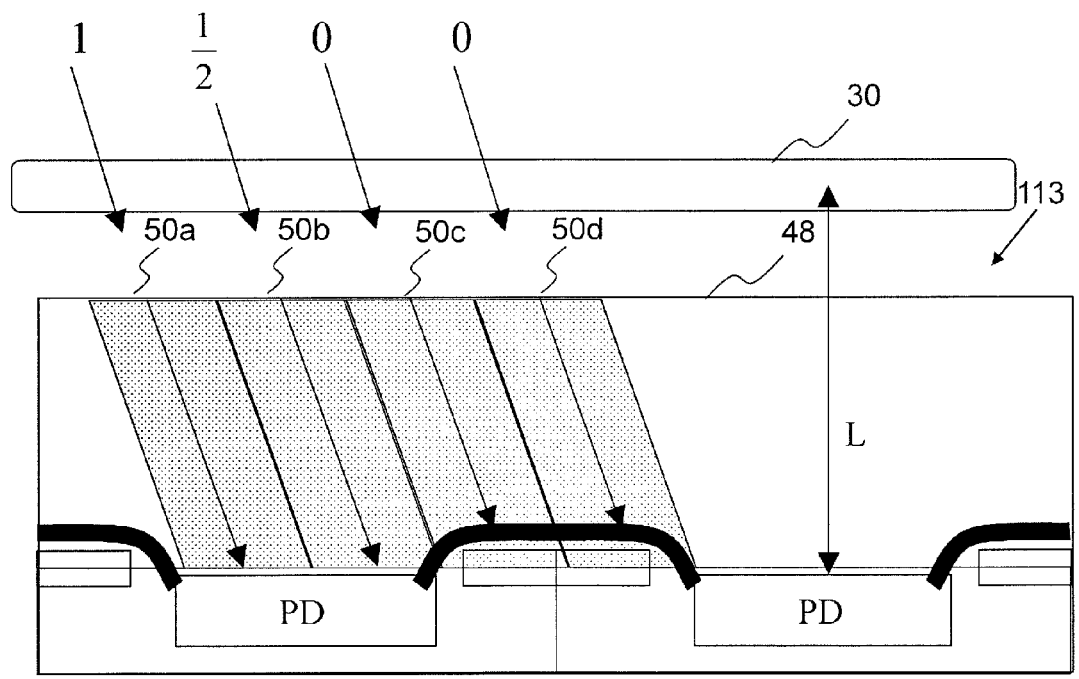
FIG. 9 is a cross-sectional view illustrating how light rays may also be incident on an image sensor according to the present disclosure.

Next, look at FIG. 9, in which the illuminating light rays are incident obliquely onto the imaging surface. Such illuminating light rays are obtained by irradiating the image sensor 113 with the light emitted from the light source 10c shown in FIG. 5C, for example. In this case, the light rays that have been transmitted through the respective upper surfaces of the subpixels 50a, 50b, 50c and 50d are incident on the photodiode 40 at ratios of 1, ½, 0 and 0, respectively.

Figure 10:
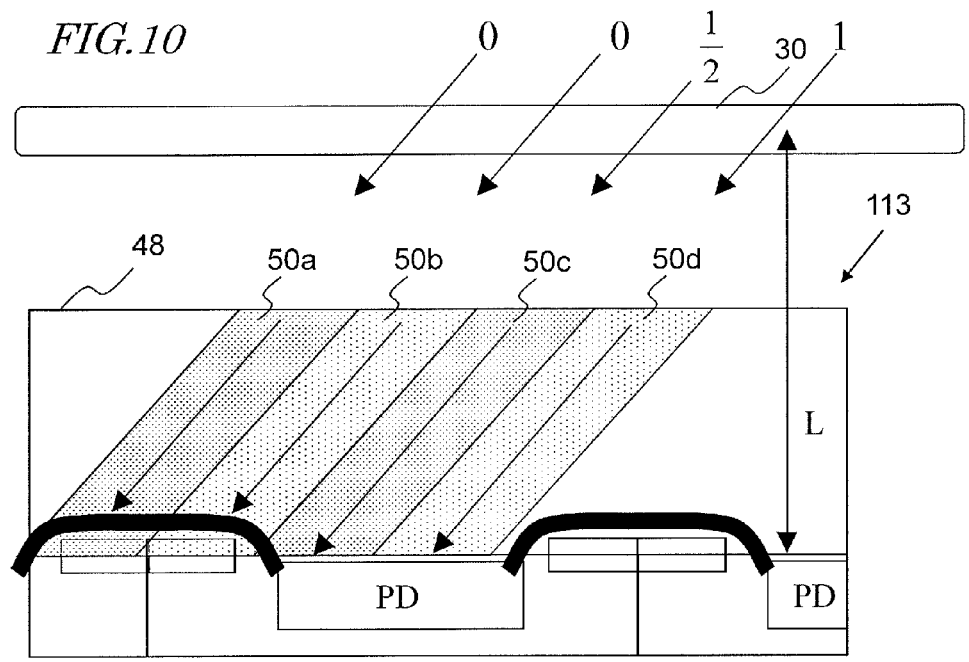
FIG. 10 is a cross-sectional view illustrating how light rays may also be incident on an image sensor according to the present disclosure.

Next, look at FIG. 10, in which the illuminating light rays are incident obliquely onto the imaging surface from the irradiation direction opposite from the one shown in FIG. 9. Such illuminating light rays are obtained by irradiating the image sensor 113 with the light emitted from the light source 10b shown in FIG. 5B, for example. In this case, the light rays that have been transmitted through the respective upper surfaces of the subpixels 50a, 50b, 50c and 50d are incident on the photodiode 40 at ratios of 0, 0, ½, and 1, respectively.

By adjusting the irradiation direction, light can be incident on the image sensor 113 from an arbitrary one of multiple different directions. And the "ratio" described above is determined by choosing one of those multiple different irradiation directions. If the structure of the image sensor 113 is known, the ratio may be either calculated or obtained by computer simulation. Or the ratio may also be determined by actual measurement using a calibration sample.

Figure 11:
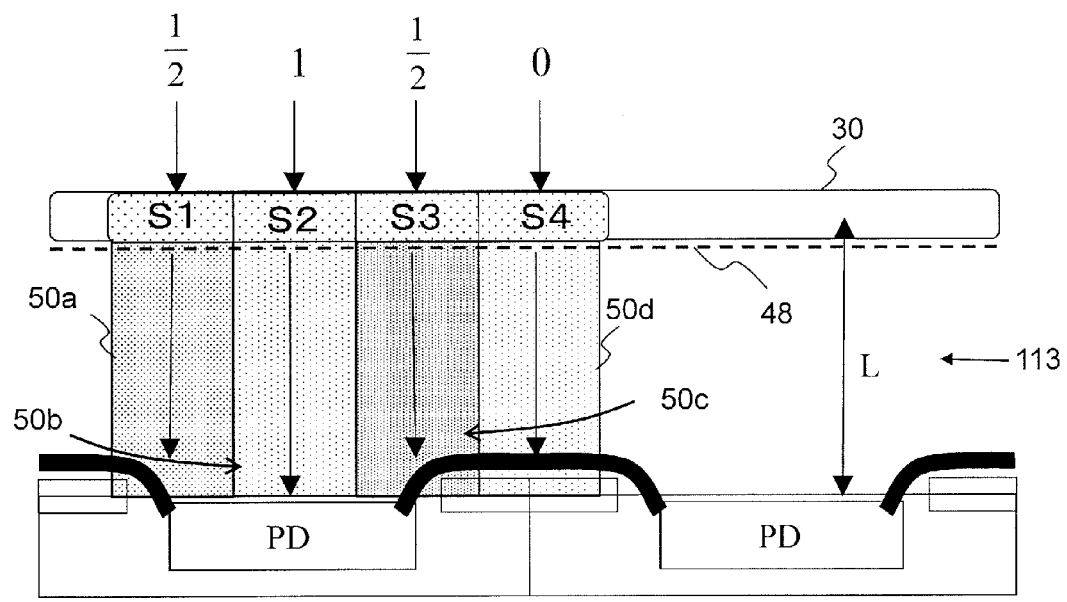
FIG. 11 is a cross-sectional view illustrating how light rays transmitted through an object may be incident on an image sensor according to the present disclosure.

FIG. 11 illustrates a state where the object 30 is put on the upper surface 48 of the image sensor 113 and irradiated with light rays coming from an irradiation direction that intersects with the imaging surface at right angles. Portions of the object 30 which face the respective upper surfaces of the subpixels 50a, 50b, 50c, and 50d will be hereinafter referred to as "subpixel portions S1 to S4" of the object 30. Also, the optical transmittances of those subpixel portions S1 through S4 will be identified herein by $S_1$ to $S_4$, too. The transmittances $S_1$ to $S_4$ of the object 30 depend on the structure or tissue architecture of the object 30 and form part of pixel information of a high-definition image of the object 30. The amounts of light rays transmitted through the subpixel portions S1 to S4 of the object 30 and incident on the photodiode 40 can be represented by values obtained by multiplying the transmittances $S_1$ to $S_4$ by the ratios described above. If the numerical values defining the ratios are ½, 1, ½ and 0, respectively, the amounts of light rays transmitted through the respective subpixel portions S1 to S4 and then incident on the photodiode 40 are $S_1/2$, $S_2$, $S_3/2$ and 0, respectively. That is to say, the output of the photodiode 40 will have magnitude corresponding to $S_1/2+S_2+S_3/2$.

As can be seen, light rays that have been transmitted through the respective subpixel portions S1 to S4 of the object 30 can be incident on a single photodiode 40, and therefore, pieces of information about those subpixel portions S1 through S4 (their transmittances) will be convoluted together in the output value of the photodiode 40. That is why the set of numerical values such as "½, 1, ½, 0" described above may be called a "convolution ratio". Such a set of numerical value may be dealt with as a vector.

By capturing images of the object 30 in multiple different irradiation directions and by getting output values of the photodiodes 40 so that each output value becomes an independent set of vectors, of which the number is equal to or greater than that of the transmittances $S_1$ to $S_4$, the transmittances $S_1$ to $S_4$ can be determined by computation.

FIG. 12A is a table showing the relations between the output values $A_1$ to $A_4$ of the photodiode 40 which have been obtained in the respective irradiation directions J1 to J4 and the transmittances $S_1$ to $S_4$. The set of output values $A_1$ to $A_4$ can be regarded as components of vector $A_j$, where j is a number of 1 to 4 specifying one of the irradiation directions J1 to J4.

In the following description, a matrix consisting of the numerical values in four columns and four rows on the table shown in FIG. 12A will be hereinafter represented by $M^i_j$, where i is equal to the number of subpixels allocated to a single pixel. A vector having the transmittances $S_1$ to $S_4$ which are unknown quantities as its components can be represented by $S_i$. In this case, the equation $M^i_j S_i = A_j$ is satisfied.

This equation $M^i_j S_i = A_j$ is satisfied with respect to every pixel. Thus, set of simultaneous equations for the entire imaging surface can be obtained. If the number of pixels is N, then the matrix can be extended as in the table shown in FIG. 12B. In such a case, $M^{ik}_j S_i = A^k_j$ is satisfied, where N is the number of pixels of the image that is the object of computation, k is a number of 1 to N specifying one of the N pixels.

Once the matrix $M^{ik}_j$ has been determined, the vector $S_i$ can be obtained by calculating the inverse matrix of the matrix $M^{ik}_j$ with respect to the vector $A^k_j$ obtained by capturing images.

According to the method described above, to obtain a high-resolution image at a zoom power n, the object may be irradiated with light beams coming from $n^2$ different light source positions, thereby capturing $n^2$ images. In this case, calibration needs to be made in advance with respect to the "convolution ratio" represented as elements of the matrix $M^i_j$.

According to another method, calibration can be made automatically by increasing the number of light sources provided.

In general, the numerical values in the matrix $M^i_j$ (matrix elements) involve some errors. However, if these errors are evaluated when the inverse matrix is calculated to obtain the vector $S_i$, a solution which is even closer to the true value can be obtained and the device can be calibrated. This point will be described in further detail below.

If the object is irradiated with light beams coming from n irradiation directions (or light sources) where n is equivalent to the zoom power n (as in FIGS. 12A and 12B), the errors that the numerical values included in the matrix $M^i_j$ may involve can neither be calculated nor calibrated. However, if the zoom power is n and if the number of irradiation directions (or light sources) provided is greater than $n^2$ (more specifically, equal to or greater than $((n+1)\times(n+1)-1))$, then there is no need to calibrate the numerical values included in the matrix $M^i_j$ in advance.

To reduce the influence of such errors that the numerical values included in the matrix $M^i_j$ involve, the shooting session may be carried out with the number of irradiation directions increased by one as in the tables shown in FIGS. 13A and 13B. This point will be described as to a situation where the zoom power n is two for the sake of simplicity. That is to say, in the example to be described below, the number of subpixels is two and the object is irradiated with illuminating light beams coming from three different irradiation directions J1, J2 and J3.

FIG. 14 is a table showing exemplary ratios in such a situation. The unknown quantities are $S_1$ and $S_2$. The pixel value obtained when an image is captured with an illuminating light beam coming from the irradiation direction J1 is $A_1$. The pixel value obtained when an image is captured with an illuminating light beam coming from the irradiation direction J2 is $A_2$. And the pixel value obtained when an image is captured with an illuminating light beam coming from the irradiation direction J3 is $A_3$. Specific numerical values measured by capturing images are substituted into $A_1$, $A_2$ and $A_3$.

FIG. 15 shows three simultaneous equations to be satisfied between $S_1$, $S_2$, $A_1$, $A_2$ and $A_3$. In these equations, the coefficients for $S_1$ and $S_2$ are equal to the numerical values of the ratios shown in FIG. 14. To obtain the two unknown quantities $S_1$ and $S_2$, basically there should be two simultaneous equations. However, by using three simultaneous equations as shown in FIG. 15, even if the numerical values of the ratios shown in FIG. 14 involve errors, a solution close to the true value can still be obtained.

Figure 16:
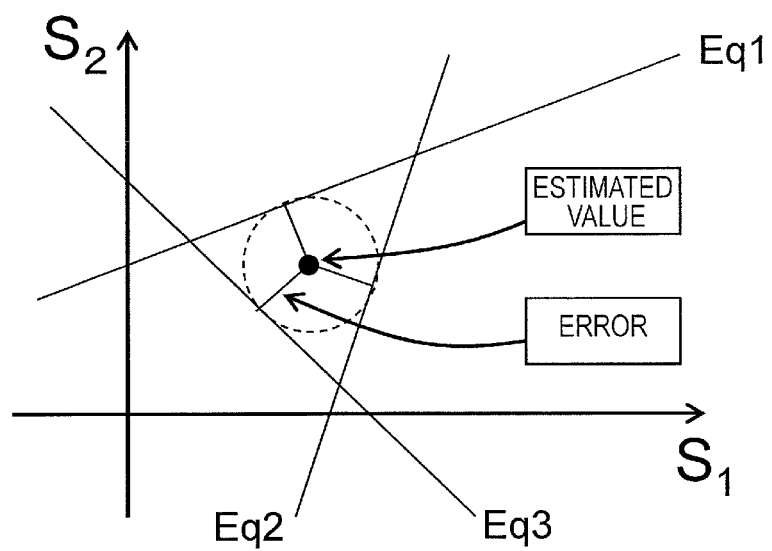
FIG. 16 is a graph showing three lines which are represented by the three conditional expressions shown in FIG. 15 on a two-dimensional coordinate plane, of which the abscissa is $S_1$ and the ordinate is $S_2$.

FIG. 16 is a graph in which three lines represented by the three equations shown in FIG. 15 are drawn on a two-dimensional coordinate plane, of which the abscissa is $S_1$ and ordinate is $S_2$. If the ratios shown in FIG. 14 had no errors, then the three lines shown in FIG. 16 would intersect with each other at a point and the coordinates of that point would correspond to the solution to be obtained. Actually, however, three intersections are observed due to errors in the exemplary graph shown in FIG. 16. These three intersections should be located in the vicinity of the true value. Thus, the central point of the delta zone surrounded with these three lines may be selected as the solution of the three simultaneous equations. The solution may also be obtained as a point at which the sum of the squares of the distances from the three lines becomes minimum. The solution thus determined is an estimated value of $S_1$ and $S_2$. As shown in FIG. 16, the distances from the estimated solution to the three lines may be defined as errors.

According to the present disclosure, an image of the object 30 is captured with substantially parallel light rays transmitted through the object 30 (with a divergent angle of $\frac{1}{100}$ radians or less). There is no need to arrange any imaging lens between the object 30 and the image sensor 113. And the object 30 may be arranged close to the image sensor 113. The interval between the imaging surface of the image sensor 113 and the object 30 is typically equal to or shorter than 100 μm and may be set to be approximately 1 μm, for example.

For example, by irradiating the object with light beams coming from 25 different directions, the resolution can be increased as much as fivefold at maximum. Supposing N is an integer which is equal to or greater than two, if images are captured by irradiating the object with light beams from $N^2$ different directions, the resolution can be increased N fold at maximum. In 2-dimensional case, to increase the resolution N fold with respect to a certain object 30 means that each pixel includes $N^2$ subpixels. If twenty-five low-resolution images are captured by sequentially irradiating the object 30 with light beams coming from twenty-five light sources which are arranged in five rows and five columns, each pixel will have subpixels arranged in five rows and five columns.

In the image forming apparatus of the present disclosure, while multiple low-resolution images are being captured with the direction of the illuminating light beam changed, it is beneficial that the object 30 should not move or be deformed.

As can be seen from the foregoing description, it is helpful to set appropriately the directions of the light beams to irradiate the object 30. Also, the object 30 and the image sensor 113 may be surrounded with walls that shut out external light so that no light other than the illuminating light is incident on the object 30 at least while images are being captured.

Embodiments of the present disclosure will now be described in further detail.

Embodiment 1

Figure 17:
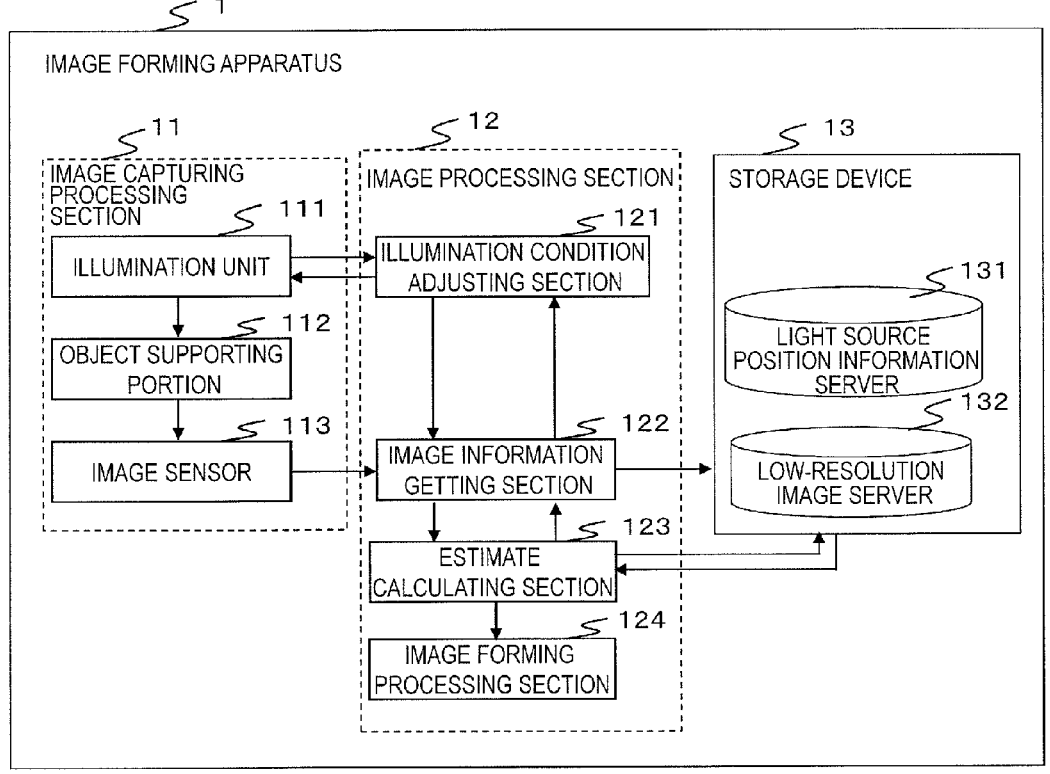
FIG. 17 is a block diagram showing an example of general configuration for an image forming apparatus according to a first embodiment.

An image forming apparatus as a first embodiment of the present disclosure will be described with reference to FIG. 17, which is a block diagram showing an example of configuration for an image forming apparatus according to this embodiment. As shown in FIG. 17, this image forming apparatus 1 includes an image capturing processing section 11 with an illuminating function and an image capturing function, an image processing section 12 which generates and outputs a high-resolution image based on low-resolution images obtained by the image capturing processing section 11, and a storage device 13 which stores light source position information and the low-resolution image.

The image capturing processing section 11 includes the illumination unit 111, the object supporting portion 112 and the image sensor 113. The illumination unit 111 has the configuration described above, and can irradiate the object with parallel light beams with a predetermined illuminance (and with a divergent angle of 1/100 radians or less, for example) from multiple directions. The object supporting portion 112 supports the object so that the interval between the imaging surface of the image sensor 113 and the object becomes equal to or shorter than 10 mm (typically 1 mm or less).

The illumination unit 111 of this embodiment includes LEDs as light sources for example. The illumination unit 111 may include LEDs in the three colors of RGB, which are arranged at respective positions. However, the light sources do not have to be LEDs but may also be light bulbs, laser diodes or fiber lasers as well. When light bulbs are used, a lens or reflective mirror which transforms the light emitted from the light bulbs into a parallel light beam may be used. Still alternatively, the light sources may also emit infrared light or ultraviolet light. Color filters which either change or filter out the wavelengths of the light emitted from the light sources may be arranged on the optical path. In this embodiment, twenty-five sets of light sources are arranged at twenty-five different light source positions.

The illumination unit 111 may include either a plurality of light sources as shown in FIGS. 5A to 5C or a single light source which is supported movably as shown in FIG. 6 so as to change the direction of the light that is going to be incident on the object.

The object supporting portion 112 is a member for supporting the object during an image capturing session, and may be the upper surface of the image sensor 113. Optionally, the object supporting portion 112 may have a mechanism to support the object so that its position does not change during an image capturing session. The object supporting portion 112 may be configured to put the object 30 on the image sensor 113 with almost no gap left between them.

Figure 18:
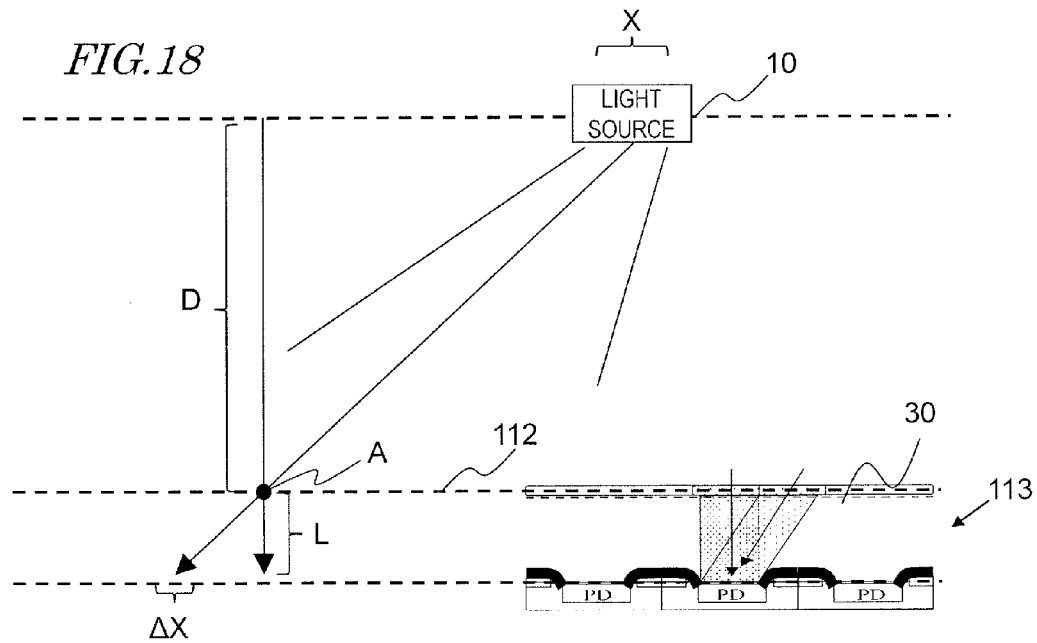
FIG. 18 is a cross-sectional view illustrating how an error is caused in the point of incidence of a light ray due to a positional shift of a light source in an image forming apparatus according to the first embodiment.

FIG. 18 illustrates the relative arrangement of the object 30 on the image sensor 113 with respect to the light source 10.

The distance D from the light source 10 to the object 30 may be set to be equal to or longer than 1 m, for example. To prevent the image from getting blurred, the interval L between the imaging surface of the image sensor 113 and the object 30 may be set to be equal to or smaller than 100 μm ($=1\times10^{-4}$ m), e.g., 1 μm ($=1\times10^{-6}$ m). Supposing D=1 m and L=$1\times10^{-6}$ m, if the light source 10 shifts X m horizontally and laterally, the light ray going out of the light source 10 and passing through a point A on the object 30 will be incident at a point on the imaging surface which has also shifted $\Delta X$ m. Since $\Delta X/X=D/L$ is satisfied, X may be reduced to 0.1 m or less to decrease $\Delta X$ to 0.1 μm ($=1\times10^{-7}$ m) or less. It is easy to set the positional shift X of the light source 10 to be 0.1 m ($=10$ cm) or less when the position of the light source 10 is adjusted. When an image sensor 113 with a pixel pitch K of about 1 μm is used, the distance from the image sensor 113 to the light source 10 may be set to be approximately 1 m. In that case, even if the light source has caused a positional shift X of several cm or so, the image quality will not be debased. Also, in view of these considerations, if red, green and blue light sources (which will be hereinafter referred to as "RGB light sources") are arranged in a particular irradiation direction close to each other so as to fall within the range of 0.1 m ($=10$ cm) or less, those light sources may be handled as a single light source.

In this embodiment, the image sensor 113 may be comprised of approximately 4800×3600 pixels, for example. In that case, the pixel pitch K may be set to be approximately 1.3 μm, for example. Also, the interval between the imaging surface and the upper surface of the image sensor, i.e., the interval L between the imaging surface and the object, may be set to be approximately 1.3 μm, for example. In this embodiment, the aperture ratio of the image sensor 113 may be, but does not have to be, 25%.

Figure 19:
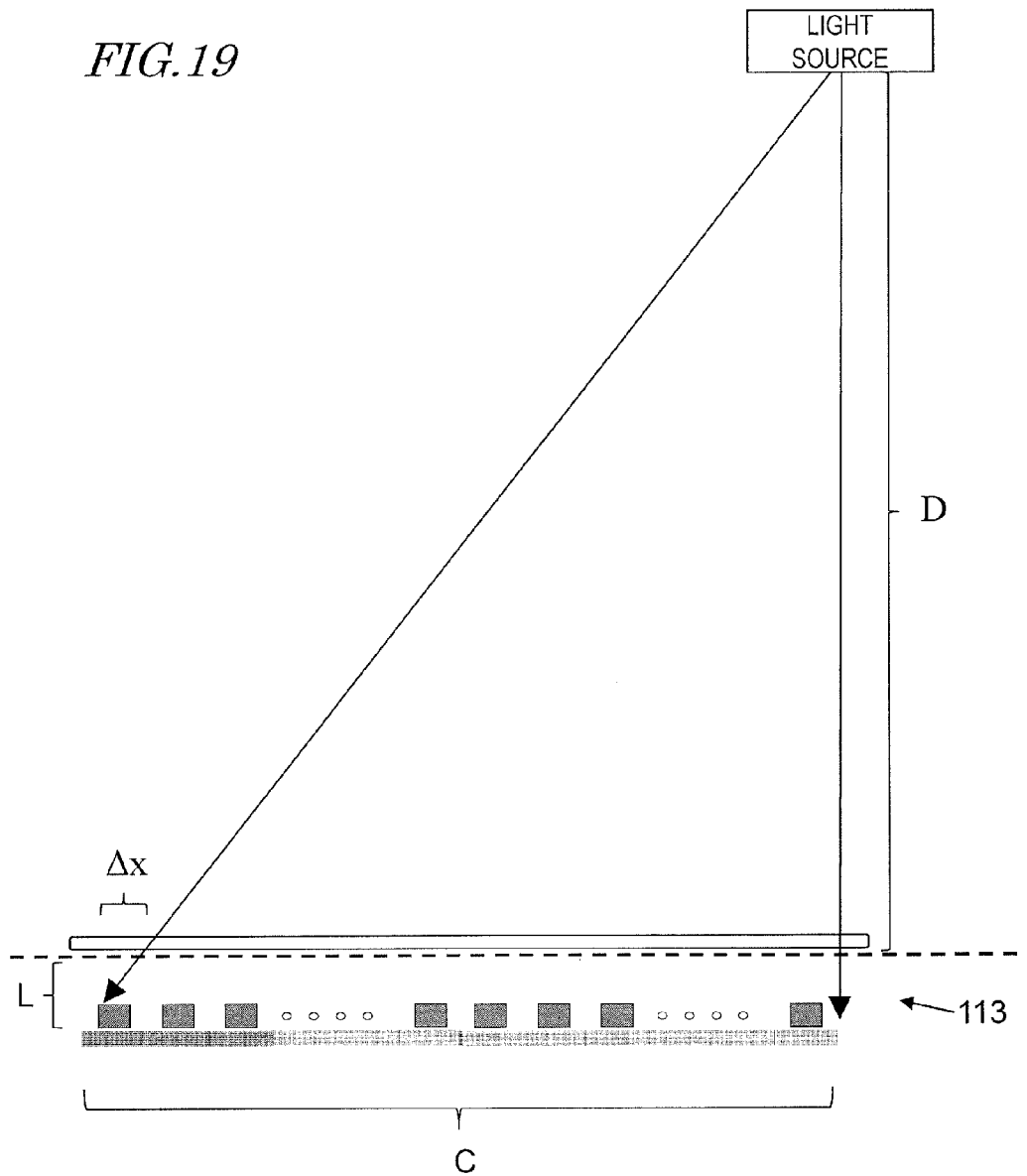
FIG. 19 is a cross-sectional view illustrating how the point of incidence of a light ray shifts due to the spread of a light beam which has been emitted from a point light source in an image forming apparatus according to the first embodiment.

FIG. 19 shows an exaggerated distribution of the angles of incidence of multiple light rays that have been emitted from a single light source 10. A light ray is incident perpendicularly onto a region which is located right under the light source 10. On the other hand, a light ray is incident obliquely onto a region which is located at an end portion of the imaging surface. Suppose the distance D from the imaging surface to the light source 10 is set to be approximately 1 m. The distance C from the center of the image sensor to the end portion is at most 10 mm ($=1\times10^{-2}$ m). Also, in this example, L=$1\times10^{-6}$ m. Ideally, the light coming from the light source should be incident perpendicularly, but is incident obliquely onto such an end portion of the imaging surface. That is why the point of incidence of such an obliquely incident light ray shifts $\Delta X$ with respect to the point of incidence of the perpendicularly incident light ray. When the exemplary set of numerical values described above is adopted, $C/D=\Delta x/L$ is satisfied. Thus, $\Delta x=(LC)/D=(1\times10^{-6}\times1\times10^{-2})/1=1\times10^{-8}=10$ nm is satisfied. That is to say, depending on whether the light ray has passed through the center or an end portion of the image sensor (i.e., depending on which portion of the object the light ray has passed through) before being incident on the photodiode, a magnitude of shift $\Delta x$ of at most 10 nm will be caused. If the pixel pitch K is 1 μm ($=1\times10^{-6}$ m), $\Delta x=10$ nm ($=1\times10^{-8}$ m) is smaller than the pixel pitch K by two digits. That is why as long as the distance D from the imaging surface to the light source 10 is set to be an appropriate value with the size of the imaging surface taken into account, the irradiation direction with respect to the object may be regarded as constant for the same light source, no matter where the light come from with respect to the object.

Now take a look at FIG. 17 again. The image processing section 12 of this embodiment includes an illumination condition adjusting section 121, an image information getting section 122, an estimate calculating section 123, and an image forming processing section 124. These components may be implemented as respective functional blocks of a computer that performs the function of the image processing section 12 and may have their functions performed by executing a computer program. The storage device 13 includes a light source position information server 131 and a low-resolution image server 132. The storage device 13 may be a hard disk drive, a semiconductor memory or an optical storage medium, or may also be a digital server which is connected to the image processing section 12 through a digital network such as the Internet.

The illumination condition adjusting section 121 of the image processing section 12 adjusts various illumination conditions (including the light source's position, its brightness, the light emission interval, and illuminance) imposed on the illumination unit 111. The image information getting section 122 controls the image sensor 113 with the illumination conditions set appropriately for the illumination unit 111 and makes the image sensor 113 capture images as the light sources to be turned ON are changed one after another. The image information getting section 122 receives data about the images (low-resolution images) captured by the image sensor 113 from the image sensor 113. Also, the image information getting section 122 gets pieces of information defining the illumination conditions (including irradiation directions, emission intensities, illuminance and wavelengths) from the illumination condition adjusting section 121 in association with the image data received.

The light source position information server 131 stores, as a database of positions, information about the light source's position provided by the image information getting section 122. In this example, the light source position information server 131 also stores a database of the matrix shown in FIG. 13B. Every time the numerical values (elements) of the matrix are adjusted by the estimate calculating section 123 to be described later, this database is rewritten.

The low-resolution image server 132 stores, as an image database, data about the low-resolution image gotten through the image information getting section 122 and information about the illumination conditions that were adopted when the low-resolution image was captured. When the image forming processing (to be described later) gets done, the data about the low-resolution image may be deleted from the image database.

In response to a signal indicating that an image capturing session has ended from the image information getting section 122, the estimate calculating section 123 of the image processing section 12 respectively gets light source position information and a low-resolution image from the light source position information server 131 and low-resolution image server 132 of the storage device 13. Then, the estimate calculating section 123 makes computations based on the principle described above, thereby estimating optical transmittances of subpixel portions constituting a high-resolution image and determining whether or not the estimation is a proper one. If the estimation is a proper one, the estimate calculating section 123 outputs the high-resolution image. Otherwise, the estimate calculating section 123 changes the light source position information. In performing the estimation operation, the estimate calculating section 123 makes reference to the database in the light source position information server 131, gets the ratio defining the numerical values (elements) in the matrix, and forms a high-resolution image based on the output of the image sensor 113. In this case, an estimated value and an error are obtained as described above. If the error exceeds a reference value (of 5%, for example), the processing of correcting the numerical value representing the ratio into another value may be performed. The error ratio may be represented by $((error)/|(S_1, S_2, \ldots, S_{25})|\times 100)$, for example.

Using this error, the experimental system may also be calibrated at the same time in order to increase the accuracy of the experiment from the next time and on. For example, if the estimated value and three lines drawn are as shown in FIG. 16, calibration can be made and the error can be eliminated by translating and correcting the three lines so that all of those three lines pass through the same estimated value.

Figure 20:
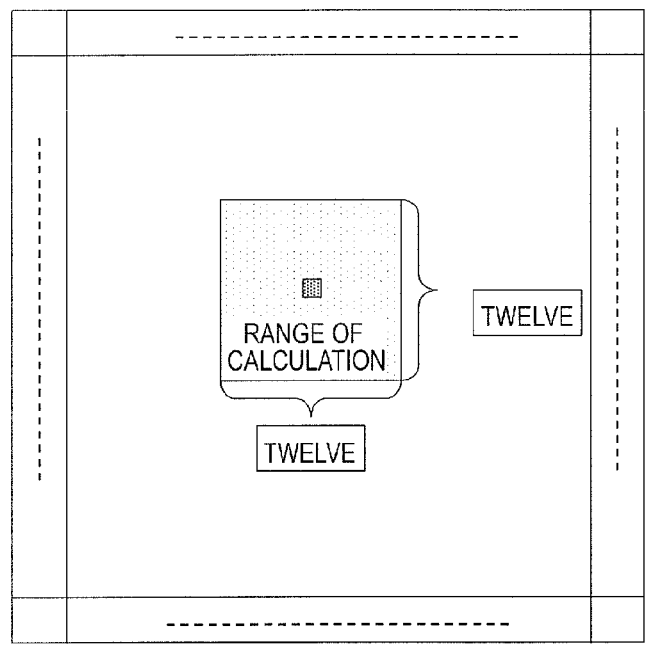
FIG. 20 illustrates an exemplary range in which calculations need to be made using a matrix.

Next, inverse matrix is calculated with the error rated. The conditional expression to use for that purpose generally tends to be a very complicated one. However, in calculating an estimated value concerning the pixels that form a rectangular block of a high-resolution image, only pixels falling within limited range of the rectangular block will affect significantly. For example, if calculations are made on the basis of a rectangular block comprised of 12×12 pixels as shown in FIG. 20, the calculations can be done at high speeds with the calculation cost cut down.

Figure 21:
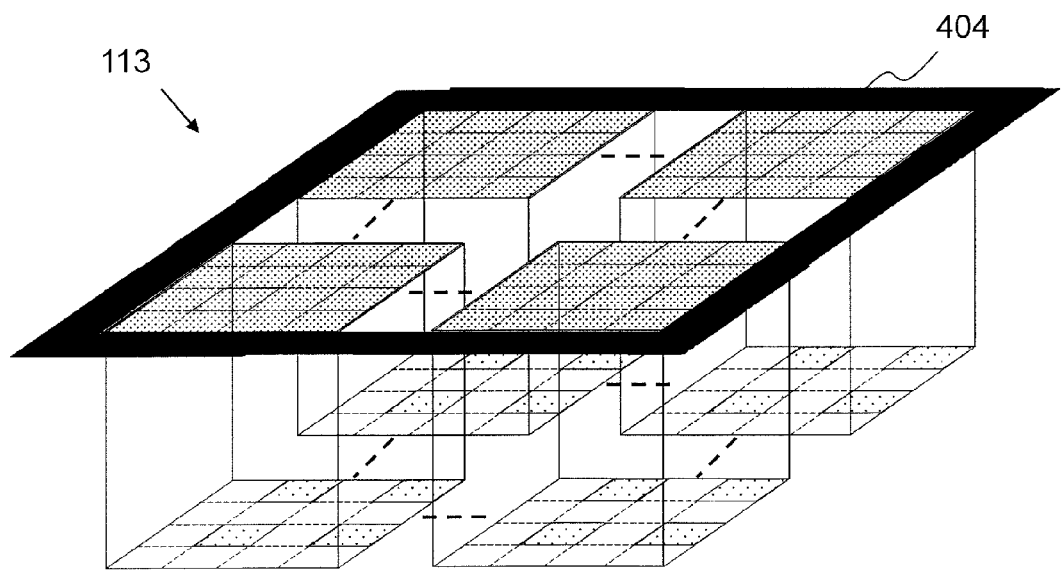
FIG. 21 is a perspective view illustrating an exemplary image sensor with an opaque portion.
Figure 22:
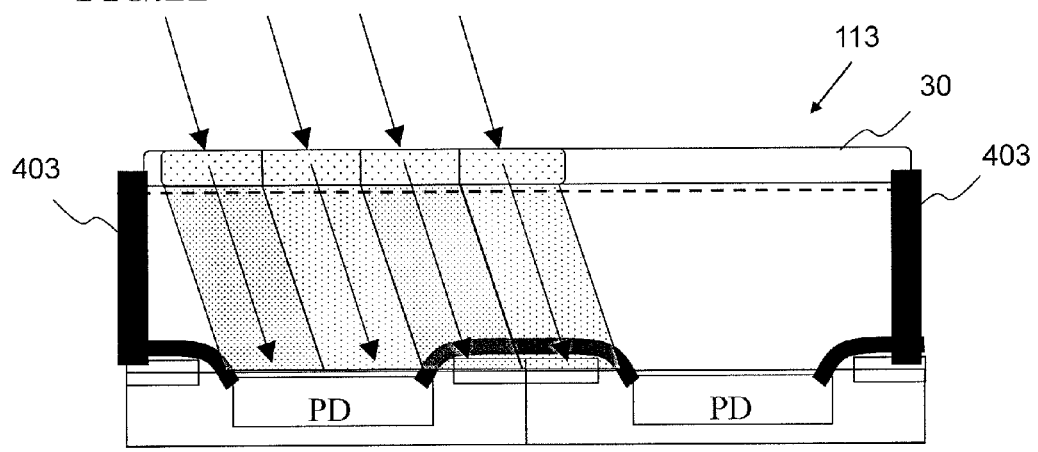
FIG. 22 is a cross-sectional view illustrating an exemplary image sensor with an opaque portion.

If the estimate calculating section 123 needs to get those calculations done over the entire image capturing area, then an opaque portion may be provided to prevent light from entering the image capturing area from outside of the object range. To prevent light from entering the image capturing area from a region where the object is not present, an opaque area 404 which limits the image capturing range may be arranged on the object supporting portion as shown in FIG. 21. Alternatively, an opaque member 403 may be arranged on a side surface of the image sensor 113 as shown in FIG. 22.

The image forming processing section 124 composes a high-resolution image based on the image information which has been provided by the estimate calculating section 123 and of which the properness has been proved, and subjects the image to color correction, de-mosaicing (also called de-pixelization) processing, grayscale correction ($\gamma$ correction), YC separation processing, overlap correction and other kinds of correction. The high-resolution image thus obtained is presented on a display (not shown) or output to a device outside of the image forming apparatus 1 through an output section. The high-resolution image output through the output section may be written on a storage medium (not shown) or presented on another display.

The low-resolution image server 132 stores data about the low-resolution image which has been gotten by the image information getting section 122. While the estimate calculating section 123 is composing an image, necessary low-resolution image data is retrieved from the database of this low-resolution image server 132. When the image forming processing gets done, unnecessary data may be deleted from the low-resolution image server 132.

According to this embodiment, if the number of irradiation directions is set to be equal to or greater than $((n+1)\times(n+1)-1)$, a high-resolution image composed of n×n pixels can be obtained. Thus, the image forming apparatus of the present disclosure can obtain an image which has been zoomed in at a high zoom power over the entire area without using a microscope which usually needs a lot of time for focusing. Consequently, even if the object is a pathological sample with a microscopic tissue, image data can be obtained at a high zoom power in a short time.

Figure 23:
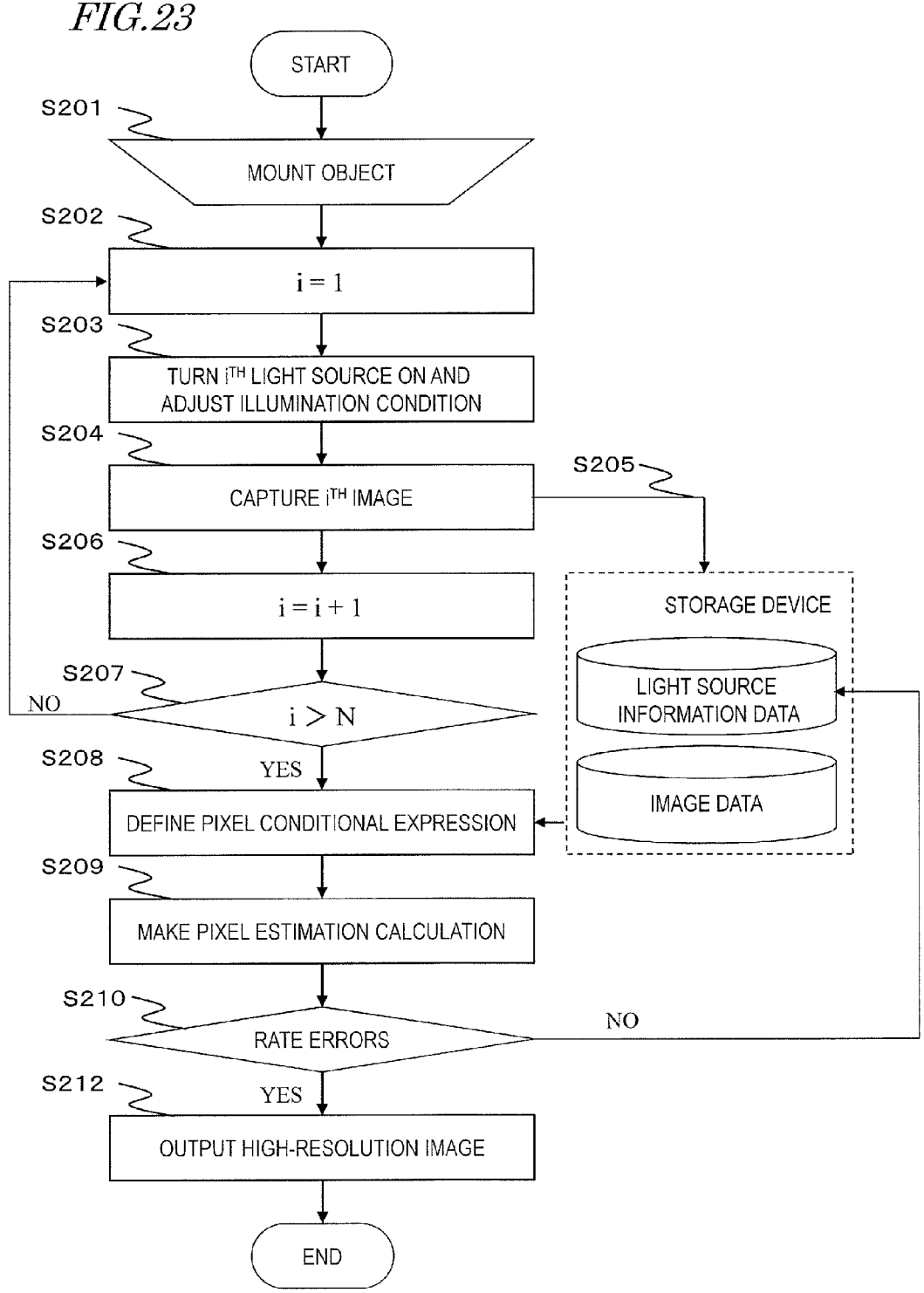
FIG. 23 is an exemplary flowchart showing how an image forming apparatus according to the first embodiment operates.

Next, it will be described with reference to FIG. 23 how the image forming apparatus 1 of the embodiment described above operates. FIG. 23 is an exemplary flowchart showing the procedure in which the image forming apparatus 1 gets an image.

In FIG. 23, first of all, the object is mounted on or above the object supporting portion 112 (in Step S201). In this example, the object is a pathological specimen. However, the object may also be light-transmitting sample, of which the thickness is about several μm and of which the shape does not change during the image capturing session (such as a cell or a sliced tissue). Optionally, the image capturing session may be carried out with slide glass reversed. In this case, cover glass 32 may be put on the upper surface of the image sensor and the sample may be put on the cover glass. The slide glass may be arranged over the image sensor.

Next, to get low-resolution images, images are captured with twenty-five light sources sequentially turned ON one after another. For example, by defining i=1 (in Step S202), only the $i^{th}$ light source is turned ON (in Step S203). An image is captured with the contrast ratio adjusted (in Step S204). And data about the image captured is stored in the image buffer in the storage device (in Step S205).

Next, i is defined to be i+1 (in Step S206) and then decision is made whether or not i has exceeded N=25 which is the number of images to be captured (in Step S207). Images are captured over and over again until i exceeds 25.

If the decision has been made that i>N is satisfied (i.e., if the answer to the query of the processing step S207 is YES), the image forming processing is carried out. For example, a pixel conditional expression to be used to form, by calculation, a high-resolution image based on respective low-resolution images is defined (in Step S208) and a pixel estimation calculation is carried out (in Step S209). Next, the error is rated (in Step S210). If the error has turned out to be less than a reference value, the high-resolution image obtained is output (in Step S212). On the other hand, if the error has turned out to be equal to or greater than the reference value, the numerical values stored in the storage device are corrected and then a pixel conditional expression is redefined (in Step S208).

According to the exemplary flow described above, a single low-resolution image is supposed to be captured for each light source position for the sake of simplicity. However, this is only an example of an embodiment of the present disclosure. If three LED light sources (e.g., RGB LED light sources) are arranged at each light source position, then three low-resolution images (RGB images) may be captured for each light source position. Consequently, by capturing low-resolution images in full colors, a full-color high-resolution image can be obtained eventually.

In the example described above, the number of multiple different irradiation directions is supposed to be twenty-five. However, the number of irradiation directions may also be less than or greater than twenty-five.

Embodiment 2

Figure 24:
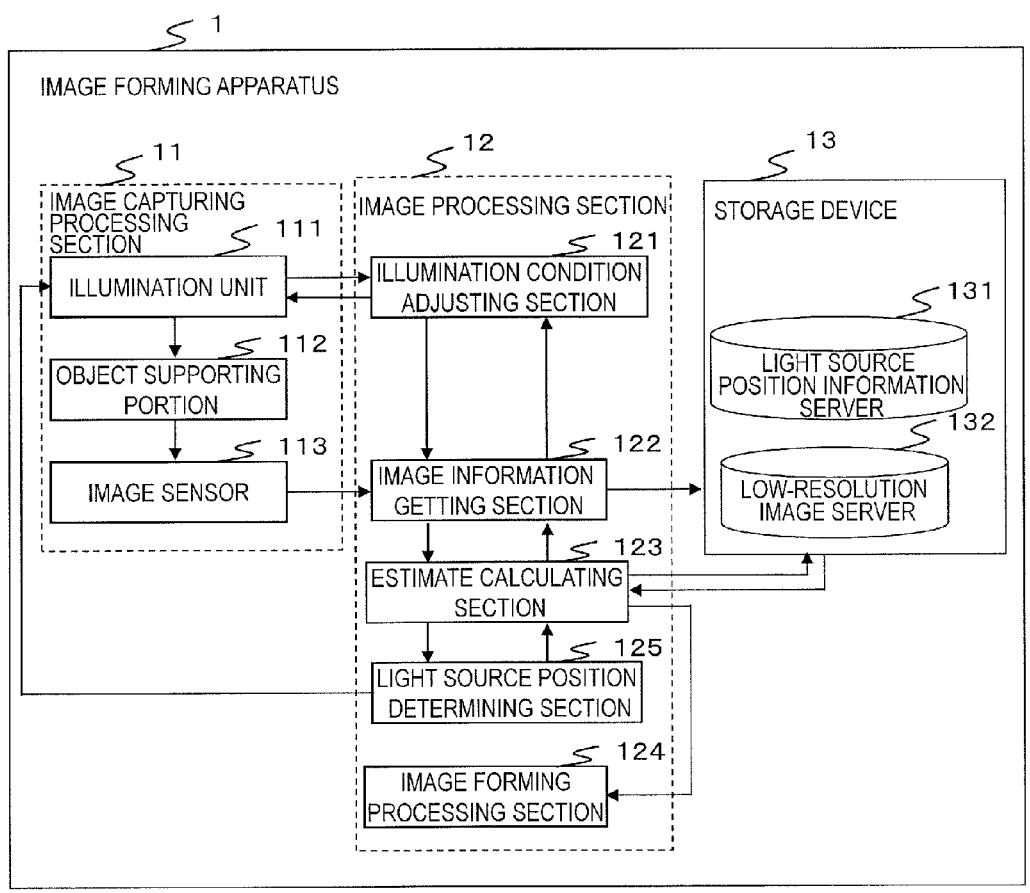
FIG. 24 is a block diagram showing an example of general configuration for an image forming apparatus according to a second embodiment.

FIG. 24 is an example of block diagram illustrating an image forming apparatus as a second embodiment of the present disclosure. In the image forming apparatus 1 of this embodiment, its image processing section 12 further includes a light source position determining section 125 which calibrates the position of the light source, which is a difference from the image forming apparatus of the first embodiment described above. Thus, according to this embodiment, the light source position can be adjusted.

Figure 25:
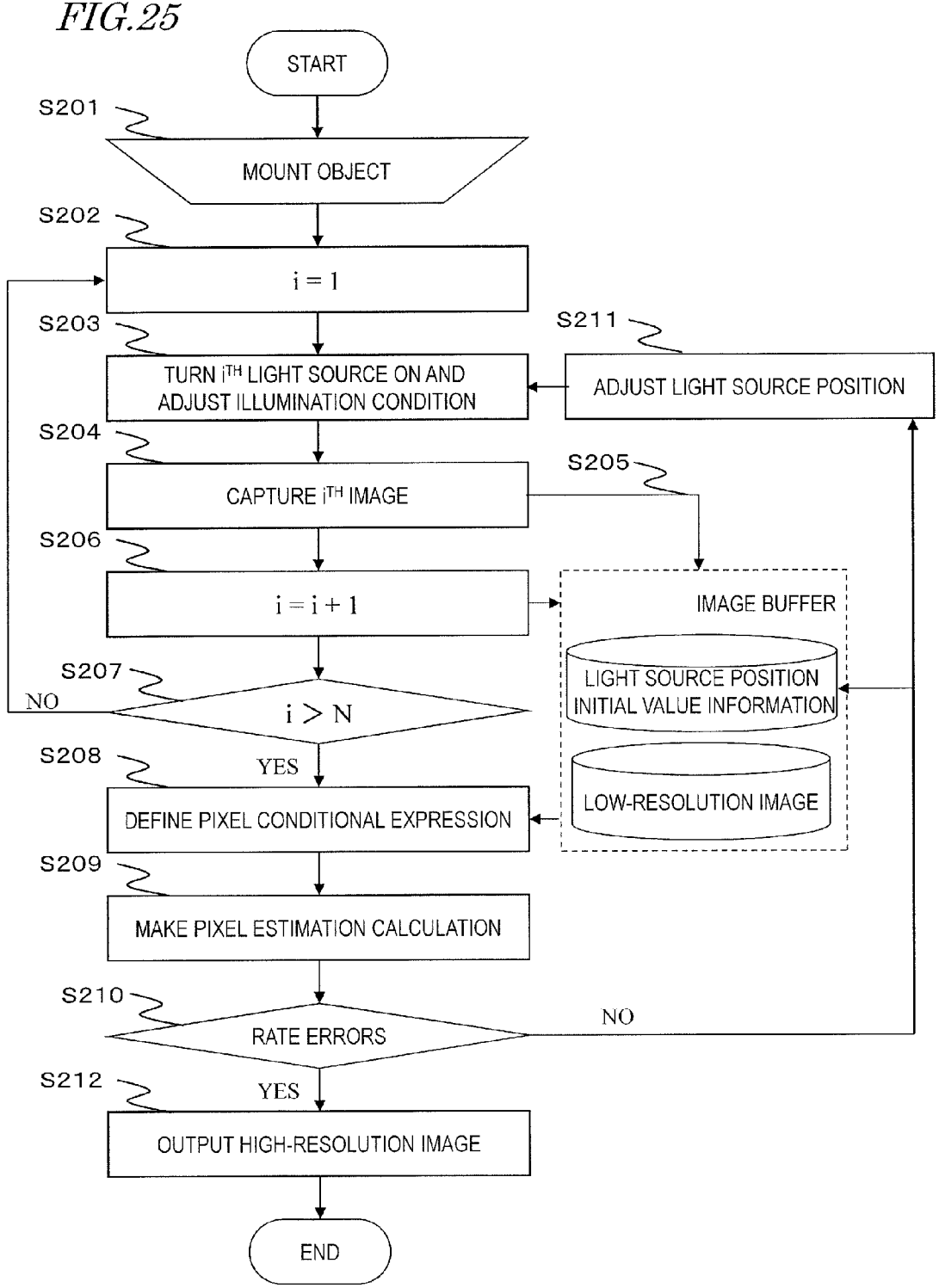
FIG. 25 is an exemplary flowchart showing how an image forming apparatus according to the second embodiment operates.

Next, an operation unique to this embodiment will be described with reference to FIG. 25.

If the decision has not been made in Step S210 that the error is less than the reference value (i.e., if the answer to the query of the processing step S210 is NO), then the light source position information involving the most significant error is corrected (in Step S211). Then, if necessary, another low-resolution image is captured all over again with the object irradiated with light coming from the adjusted light source position (in Step S203).

Embodiment 3

According to a third embodiment of the present disclosure, the vector $S_j$ representing a high-resolution image is not obtained by calculating the inverse matrix. Instead, a high-resolution image is generated by using general super-resolution processing. To increase the resolution using an inverse matrix, supposing the image size of a high-resolution image is w×h, the inverse matrix of a matrix wh×wh should be obtained. That is why the larger the image size, the more difficult it is to get computation done. On the other hand, super-resolution processing can get done by making computation within real time. For that reason, it is easy even for a computer with low computational ability to get the super-resolution processing done, which is beneficial.

According to the super-resolution processing of this embodiment, computation is carried out in a frequency domain using a Wiener filter represented by the following Equation (1):

$$H(Y) = H(D)^{-1} H(X) \qquad (1)$$

$$H(D)^{-1} = \frac{H(D)}{H(D)^2 + \Gamma} \qquad (2)$$

where Y is a zoomed-in image to be described below, X is a high-resolution image to be obtained, D is the convolution ratio, and H(.) represents conversion into a frequency domain. $H(D)^{-1}$ is given by Equation (2). In the denominator of the right side of Equation (2), $\Gamma$ is a parameter representing an SNR.

Figure 26:
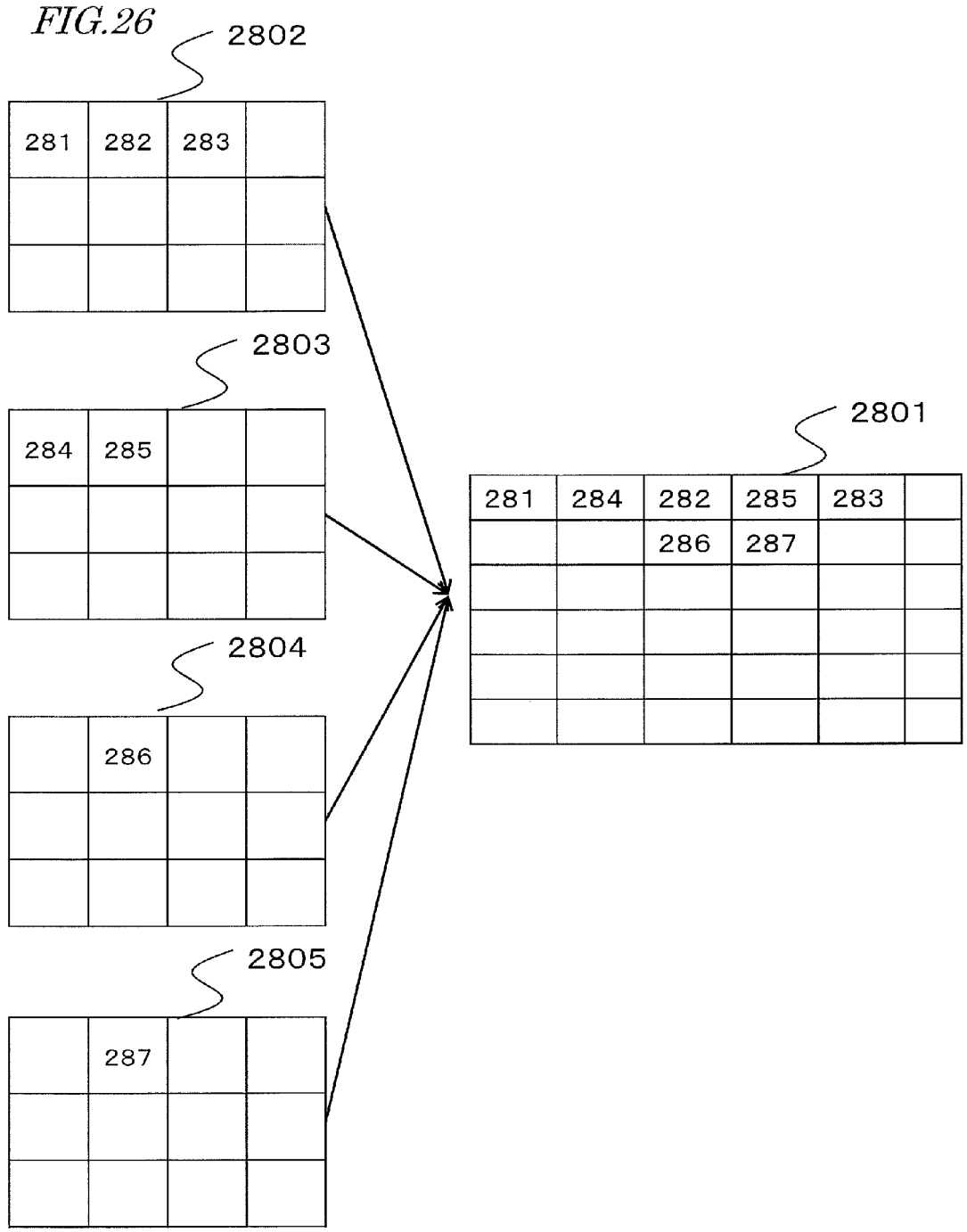
FIG. 26 illustrates how to form a zoomed-in image 2801 to obtain a high-resolution image at a zoom power of 2×.

An example of Y will be described with reference to FIG. 26, which illustrates how to form a zoomed-in image 2801 to obtain a high-resolution image at a zoom power of 2×. Y corresponds to the zoomed-in image 2801.

To obtain the zoomed-in image 2801 at a zoom power of 2×, the object is irradiated with light beams from four directions. In FIG. 26, the low-resolution image 2802 is captured when the object is irradiated with a light beam coming from right over the object. The low-resolution image 2803 is captured when the light source is moved by a different distance only in the X-axis direction. The low-resolution image 2804 is captured when the light source is moved by a different distance only in the Y-axis direction. And the low-resolution image 2805 is captured when the light source is moved along the bisector between the X- and Y-axis directions.

As can be seen, according to this embodiment, super-resolution processing is carried out by making computations in a frequency domain using a Wiener filter. However, this is only an example and the super-resolution processing does not always have to be carried out in this manner. For example, the super-resolution processing may also be carried out using the following update equations (3) and (4):

$$E = (Y - D * X)^2 \qquad (3)$$

$$x_{i,j}^{t+1} = x_{i,j}^t - \lambda \frac{\partial E}{\partial x_{i,j}} \qquad (4)$$

Equation (3) is obtained by differentiating Equation (4) with $X_{i,j}^t$. In Equation (4), $X_{i,j}^t$ represents the $(i, j)^{th}$ pixel value in the image X when the same computation is carried out for the $t^{th}$ time, and $\lambda$ represents a parameter at the time of update. Optionally, an L2 norm cost function or L1 norm cost function may also be used to Equation (3) with noise in the image taken into account.

According to this embodiment, a high-resolution image can be obtained within real time. In addition, just like when the resolution is increased using an inverse matrix, the super-resolution processing can also be carried out based on pixels falling within only a limited range as shown in FIG. 20. On top of that, the image may be divided into multiple small regions and different kinds of resolution enhancement processing, including inverse matrix computation, can be carried out in the respective small regions. In that case, in regions where the resolution enhancement processing does not need to be carried out (as in small regions where the object is not shot on the image), no resolution enhancement processing may be carried out. The speed and accuracy of computation vary depending on the method in obtaining a high-resolution image. That is why by getting computation done speedily in an unimportant region around the background and by carrying out the processing accurately in a small region where the object is shot on the image, only a region that the user wants to view can have its resolution increased selectively.

MODIFIED EXAMPLE

Figure 27:
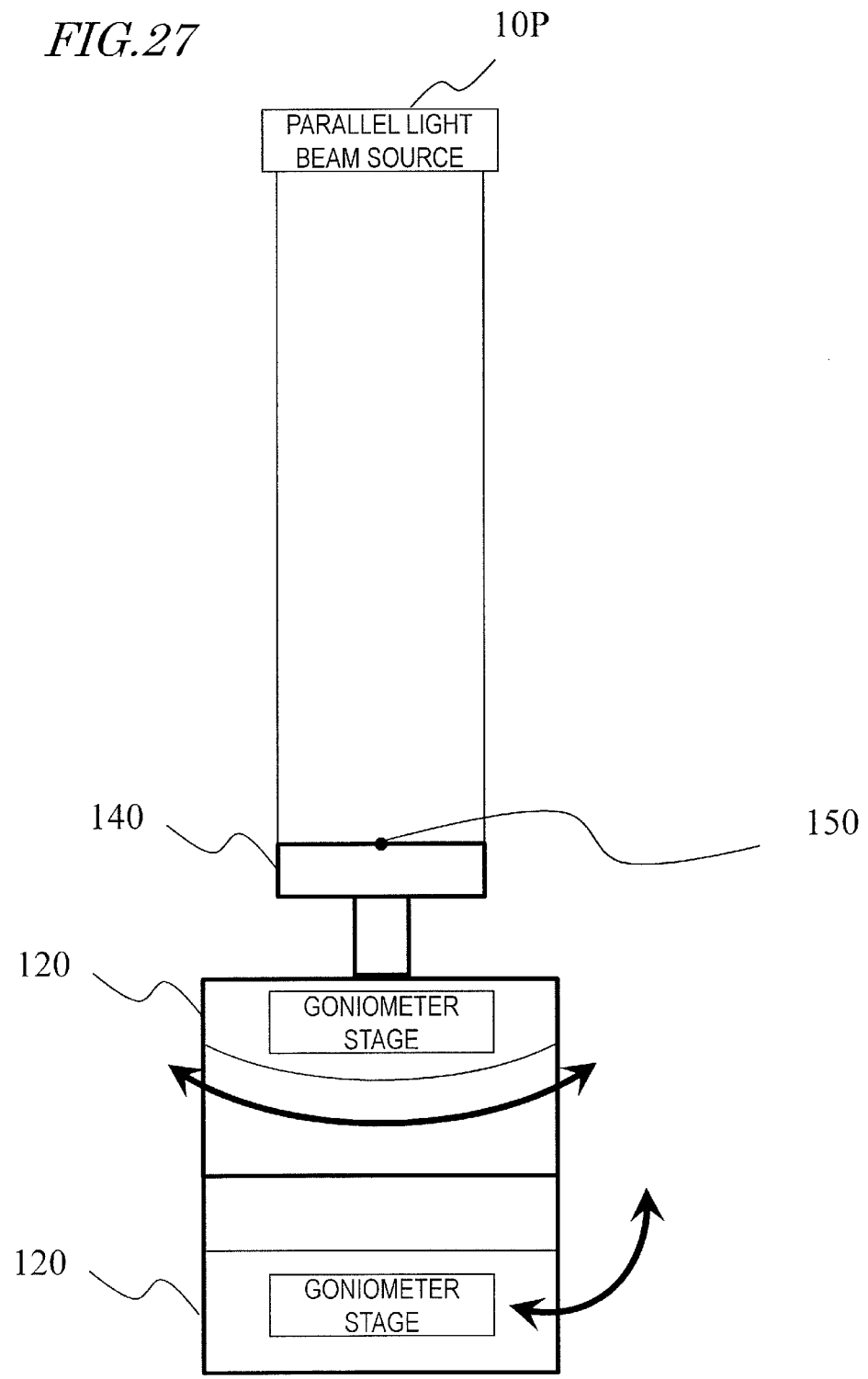
FIG. 27 illustrates a modified example with a holder which holds an object of shooting and an image sensor in an attachable and removable state.
Figure 28:
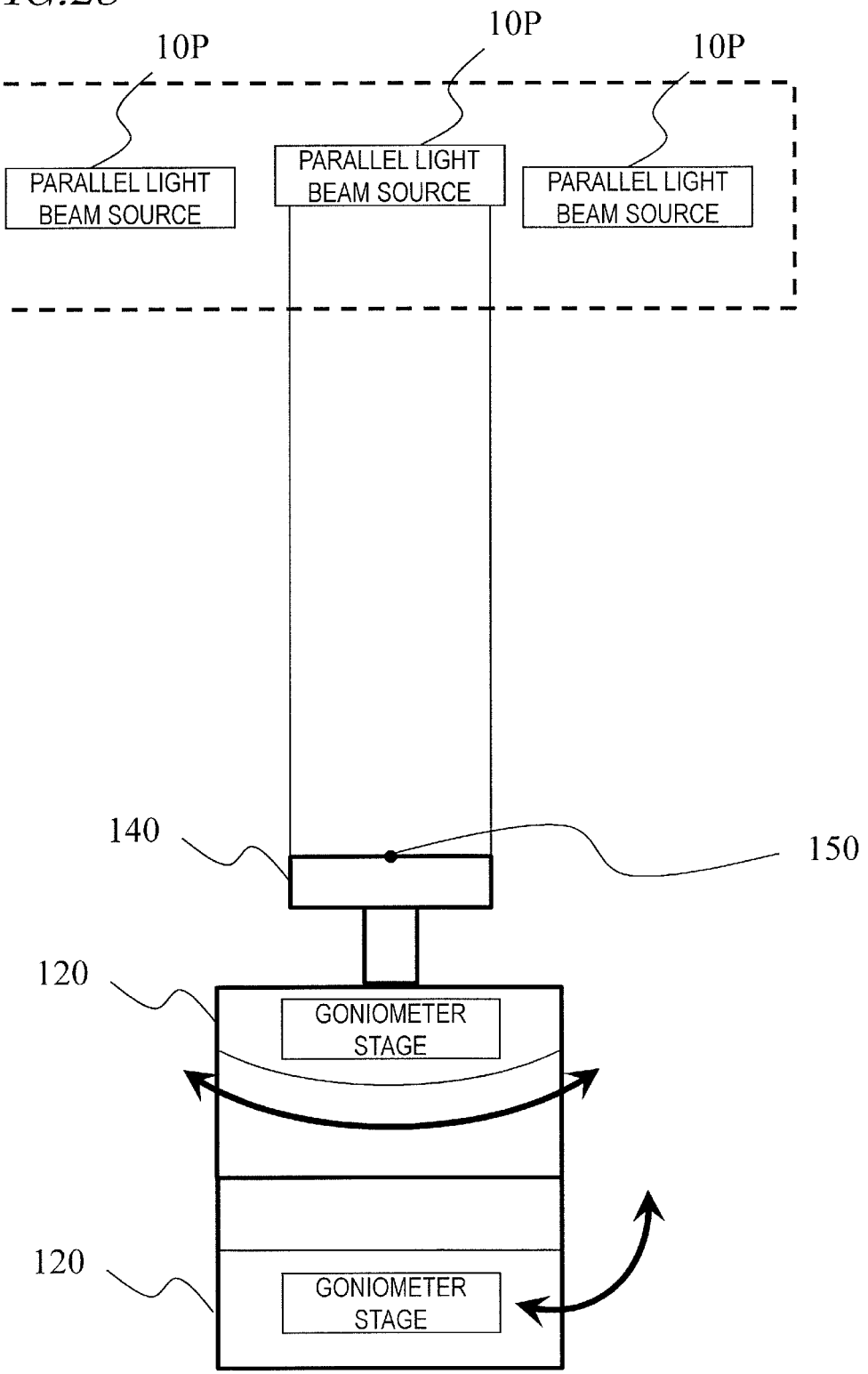
FIG. 28 illustrates another modified example with a holder which holds an object of shooting and an image sensor in an attachable and removable state.

FIG. 27 schematically illustrates a configuration for a modified example including a holder which holds the object and image sensor (which will be hereinafter referred to as an "object of shooting 140") in an attachable and removable state. The object of shooting 140 can be a prepared specimen in which the object and image sensor are combined together. In this example, an angle of illumination adjusting section has a mechanism which changes the orientation of the object of shooting 140. This mechanism includes two gonio systems 120 which can rotate the object within a perpendicular planes that intersect at right angles. The center of rotation 150 of the gonio systems 120 is located at the center of the object in the object of shooting 140. In this modified example, the gonio system 120 can change the irradiation direction of the illuminating light, and therefore, the light source 10P may be fixed. Also, in this modified example, the light source 10P is configured to emit a parallel light beam. Alternatively, the image forming apparatus of this modified example may include a plurality of parallel light beam sources 10P as shown in FIG. 28.

In this case, the configuration in which the light source 10P is fixed and the object of shooting 140 is moved is advantageous than the configuration in which the object of shooting 140 is fixed and the light source 10P is moved, because the former configuration contributes to getting the shooting session done in a shorter time. This is also because the distance L1 from the object of shooting 140 to the light source 10P is so much longer than the interval L2 between the object and the image sensor that form the object of shooting 140 that the light source 10P should be significantly moved proportionally to the long distance according to the latter configuration. By getting the shooting session done in a shorter time, even if the object changes with time on a second basis (e.g., even if the object is luminescence from a biological sample), an appropriate image can also be shot.

Figure 29:
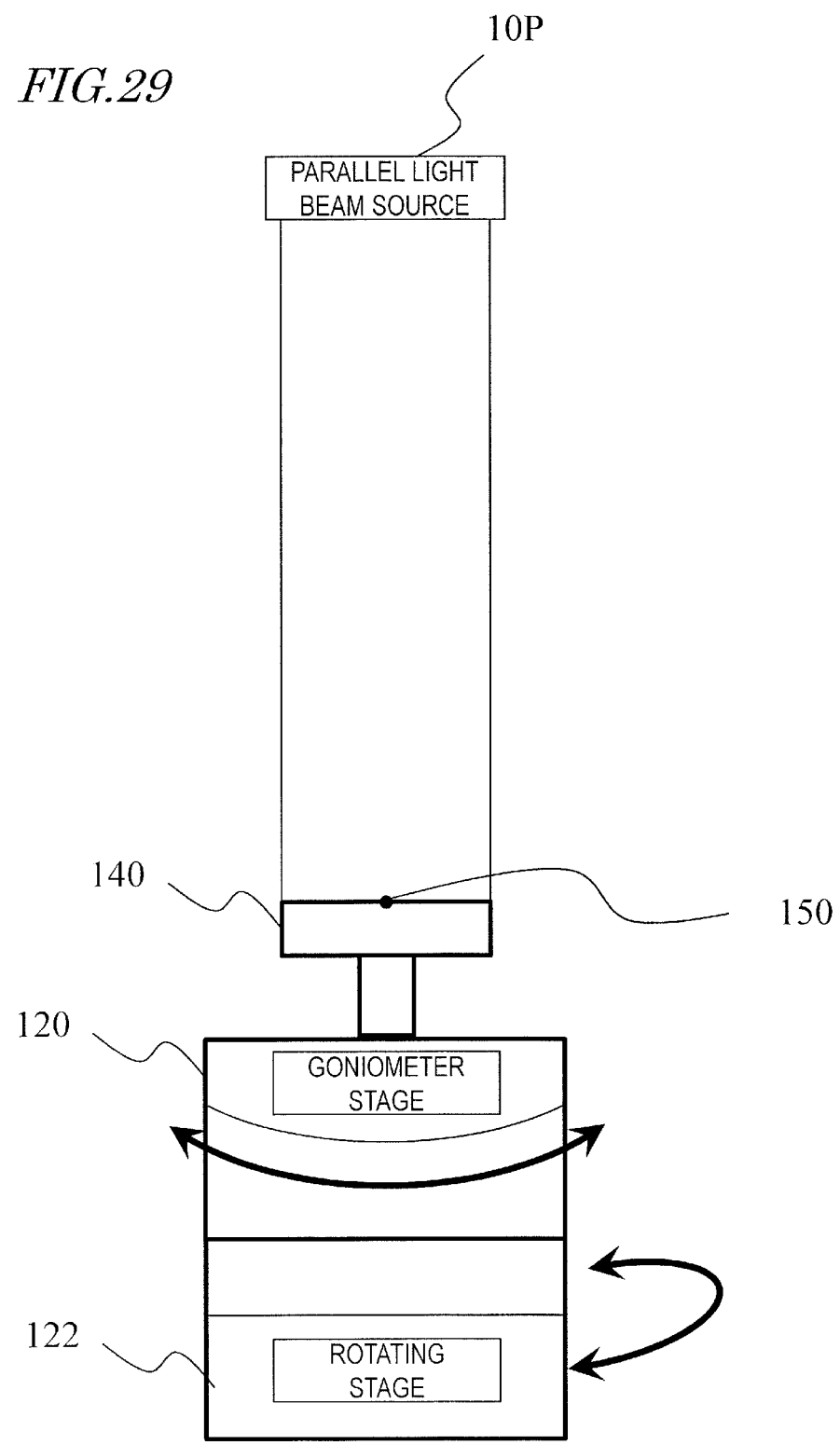
FIG. 29 illustrates still another modified example with a holder which holds an object of shooting and an image sensor in an attachable and removable state.
Figure 30:
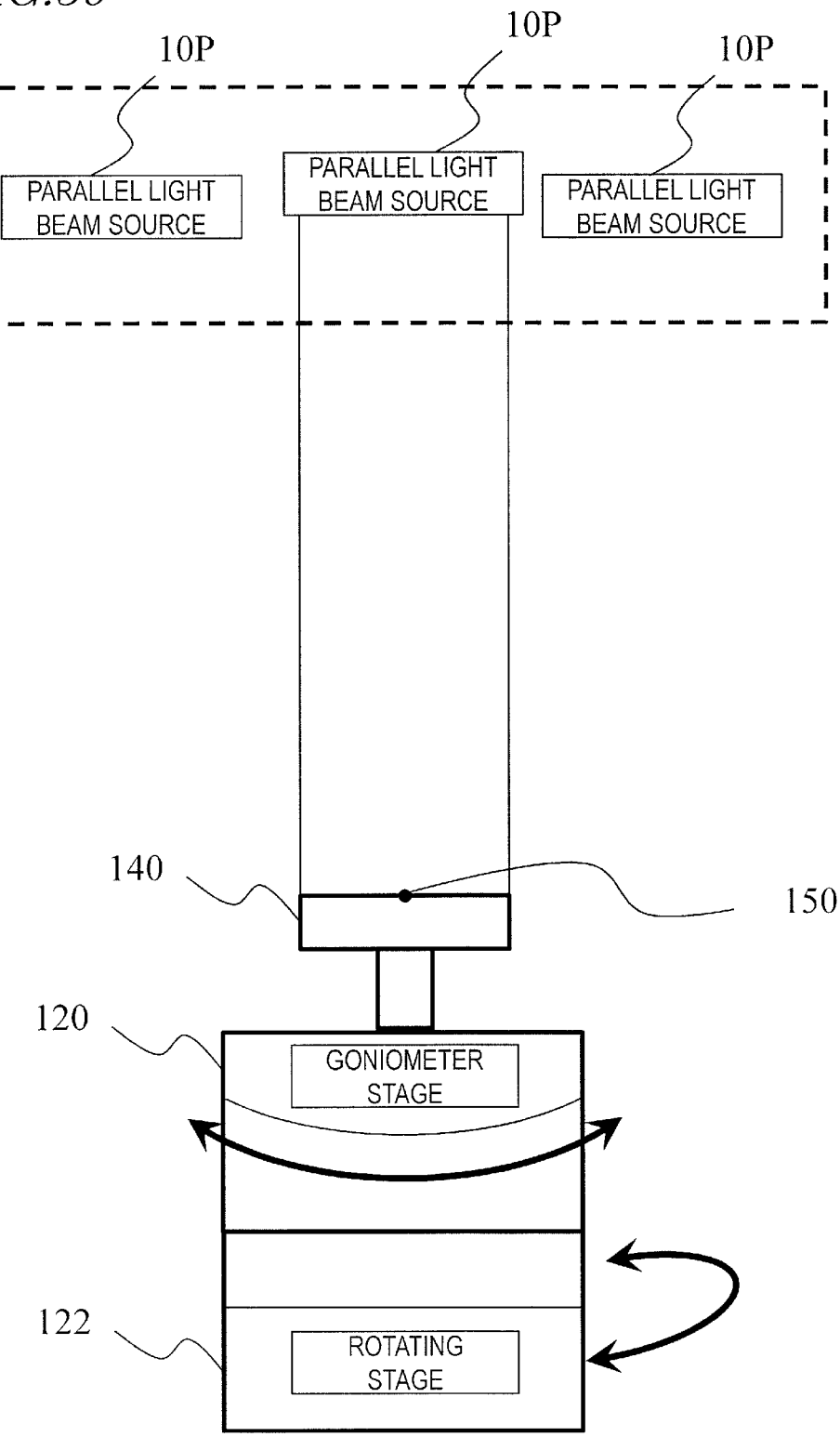
FIG. 30 illustrates yet another modified example with a holder which holds an object of shooting and an image sensor in an attachable and removable state.

FIG. 29 illustrates a configuration for a modified example in which a mechanism for changing the object's orientation includes a gonio system 120 and a rotating mechanism 122. By combining the rotation of the object of shooting 140 which is caused by the gonio system 120 within a perpendicular plane with the rotation of the object of shooting 140 which is caused by the rotating mechanism 122 around a perpendicular axis, the object of shooting 140 can be irradiated with an illuminating light beam coming from any arbitrary irradiation direction. A point 150 is located at the center of rotation of the gonio system 120 and at the center of rotation of the rotating mechanism 122. Alternatively, the image forming apparatus of this modified example may include a plurality of parallel light beam sources 10P as shown in FIG. 30.

Figure 31:
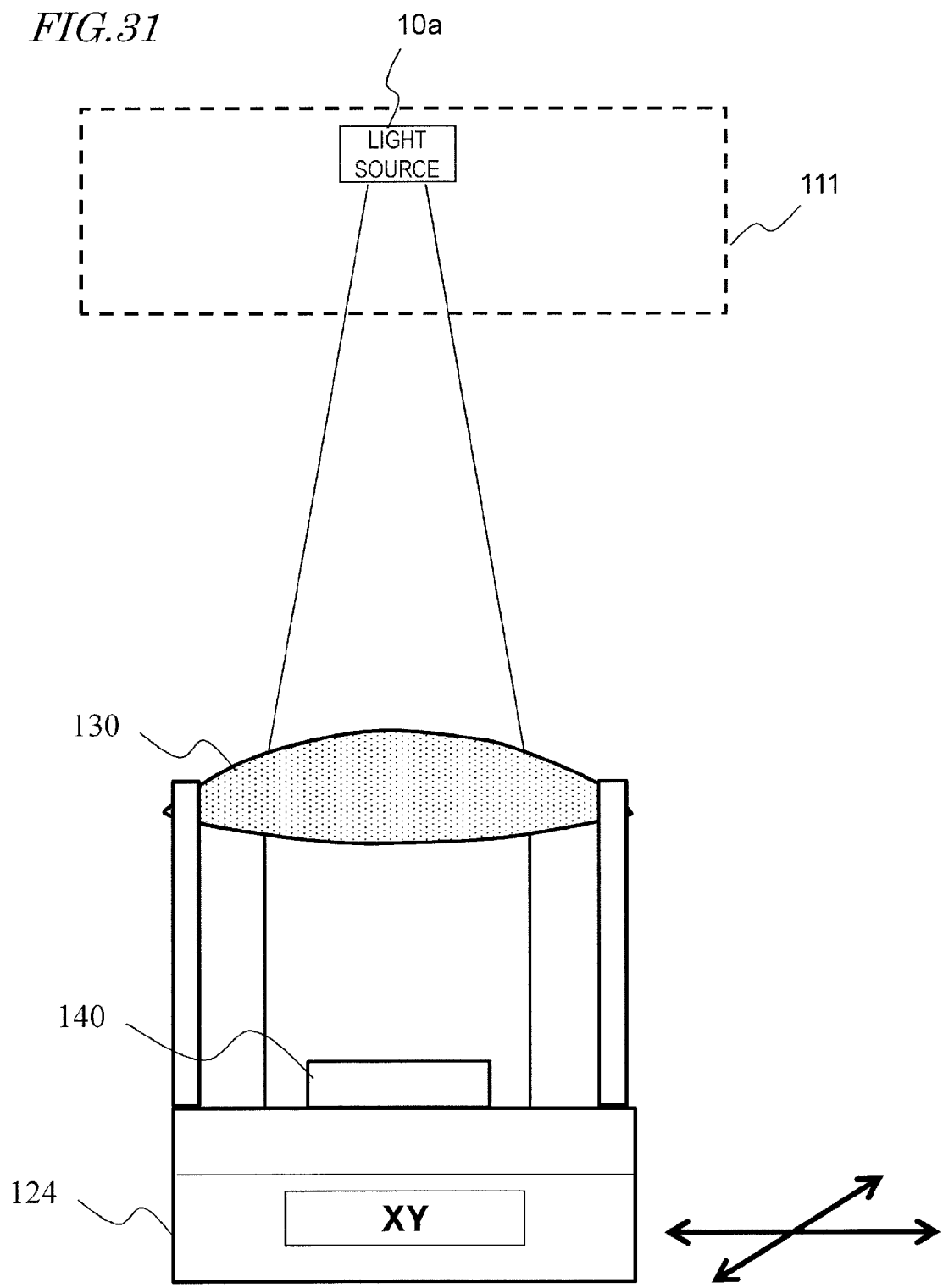
FIG. 31 illustrates yet another modified example with a holder which holds an object of shooting and an image sensor in an attachable and removable state.

FIG. 31 illustrates an exemplary optical system which can increase the degree of parallelism of the light emitted from a light source and can make a parallel light beam incident on the object. In this example, a lens 130 which collimates divergent light emitted from the light source is provided for an XY moving mechanism (moving stage) 124. Along with the moving stage 124, the object of shooting 140 can be moved by an arbitrary distance along the X axis and/or the Y axis within a horizontal plane.

Figure 32:
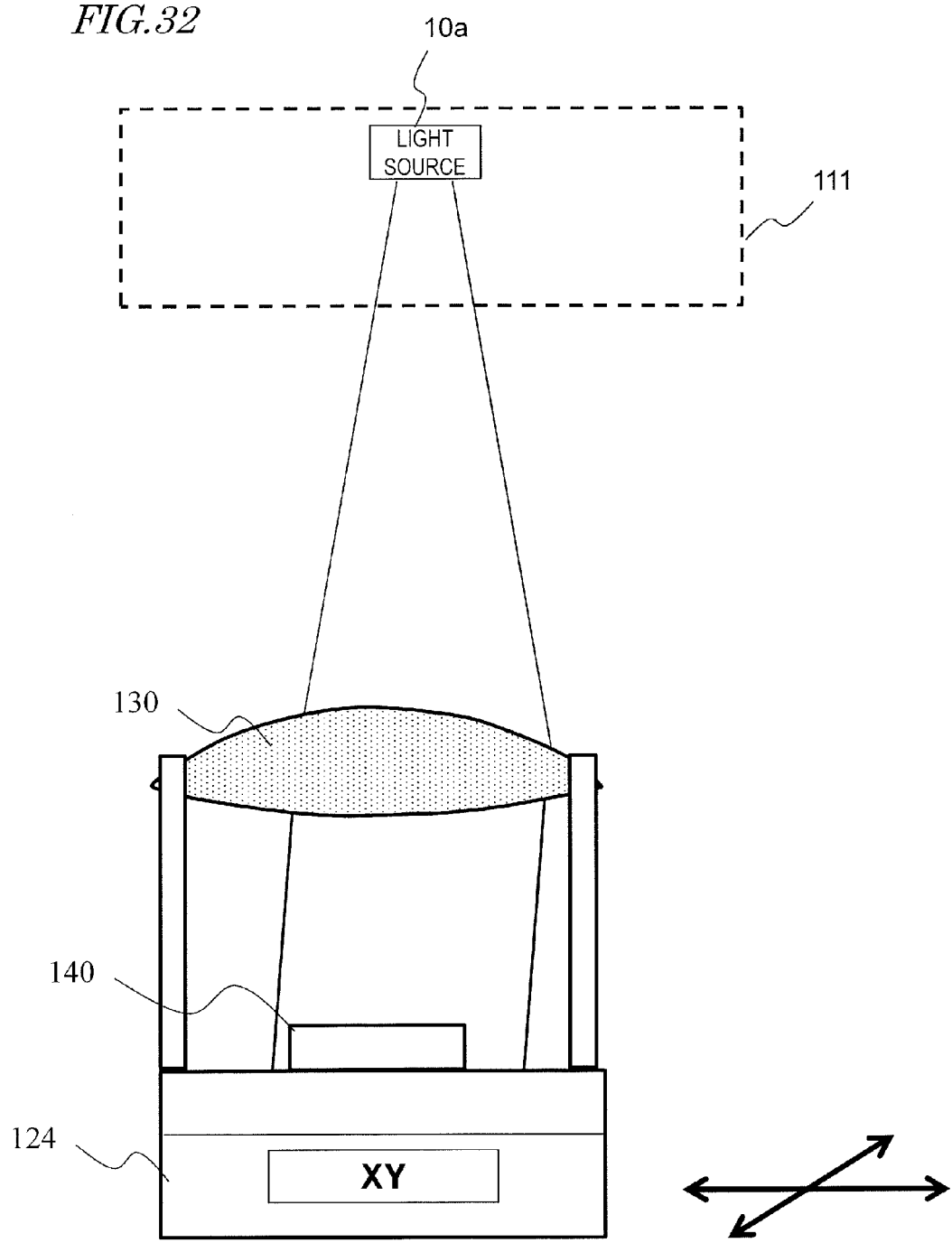
FIG. 32 illustrates yet another modified example with a holder which holds an object of shooting and an image sensor in an attachable and removable state.
Figure 33:
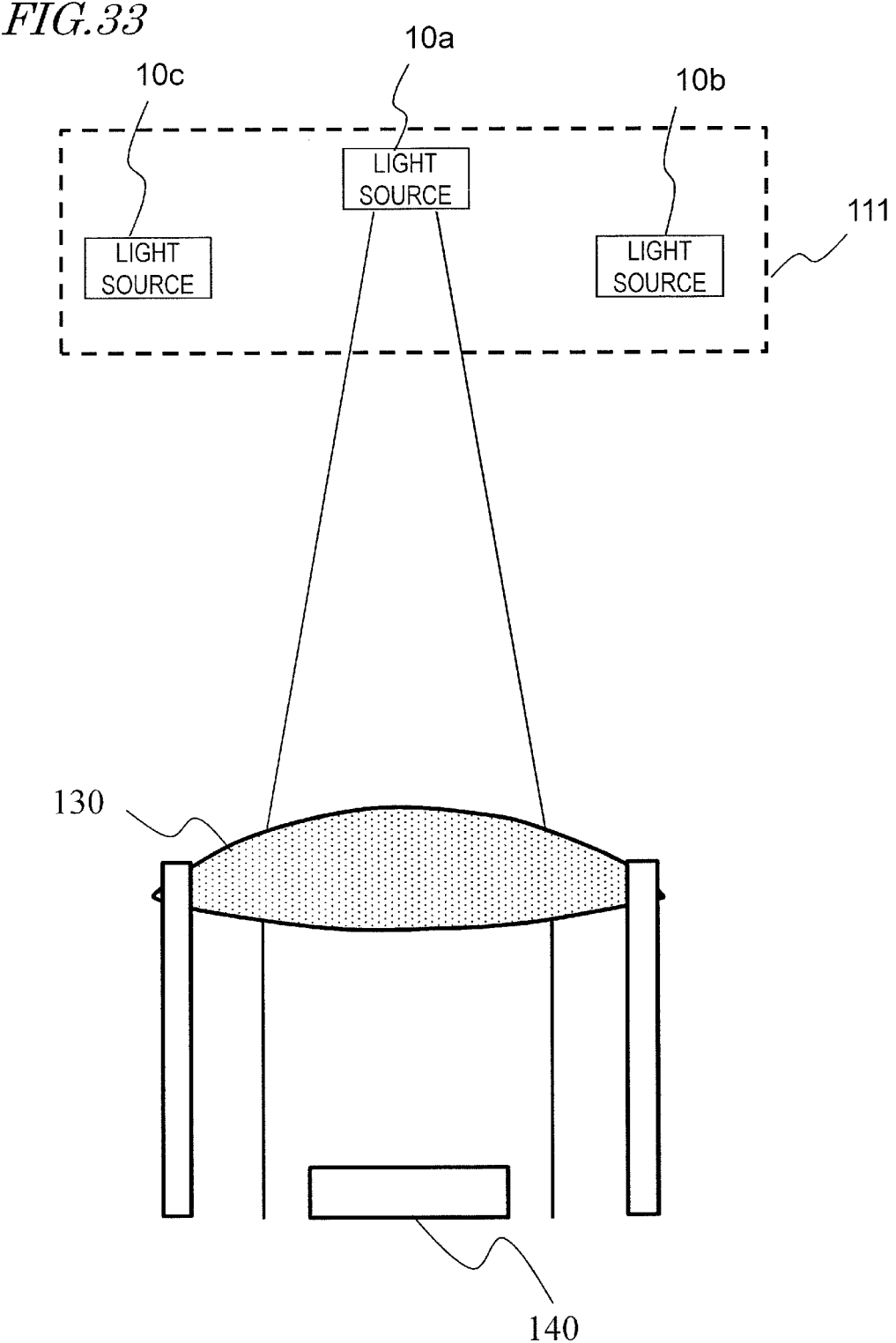
FIG. 33 illustrates yet another modified example with a holder which holds an object of shooting and an image sensor in an attachable and removable state.
Figure 34:
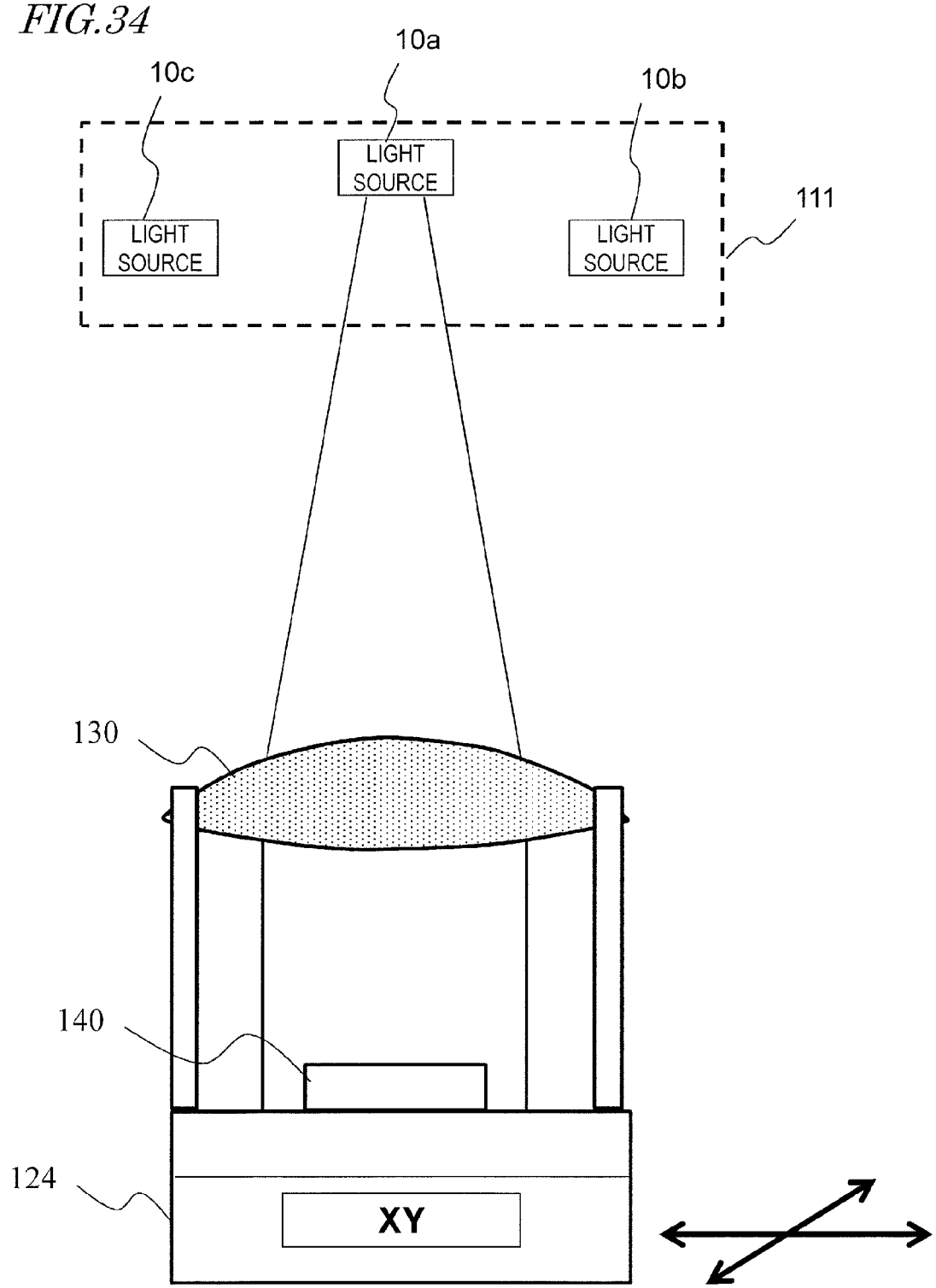
FIG. 34 illustrates yet another modified example with a holder which holds an object of shooting and an image sensor in an attachable and removable state.
Figure 35:
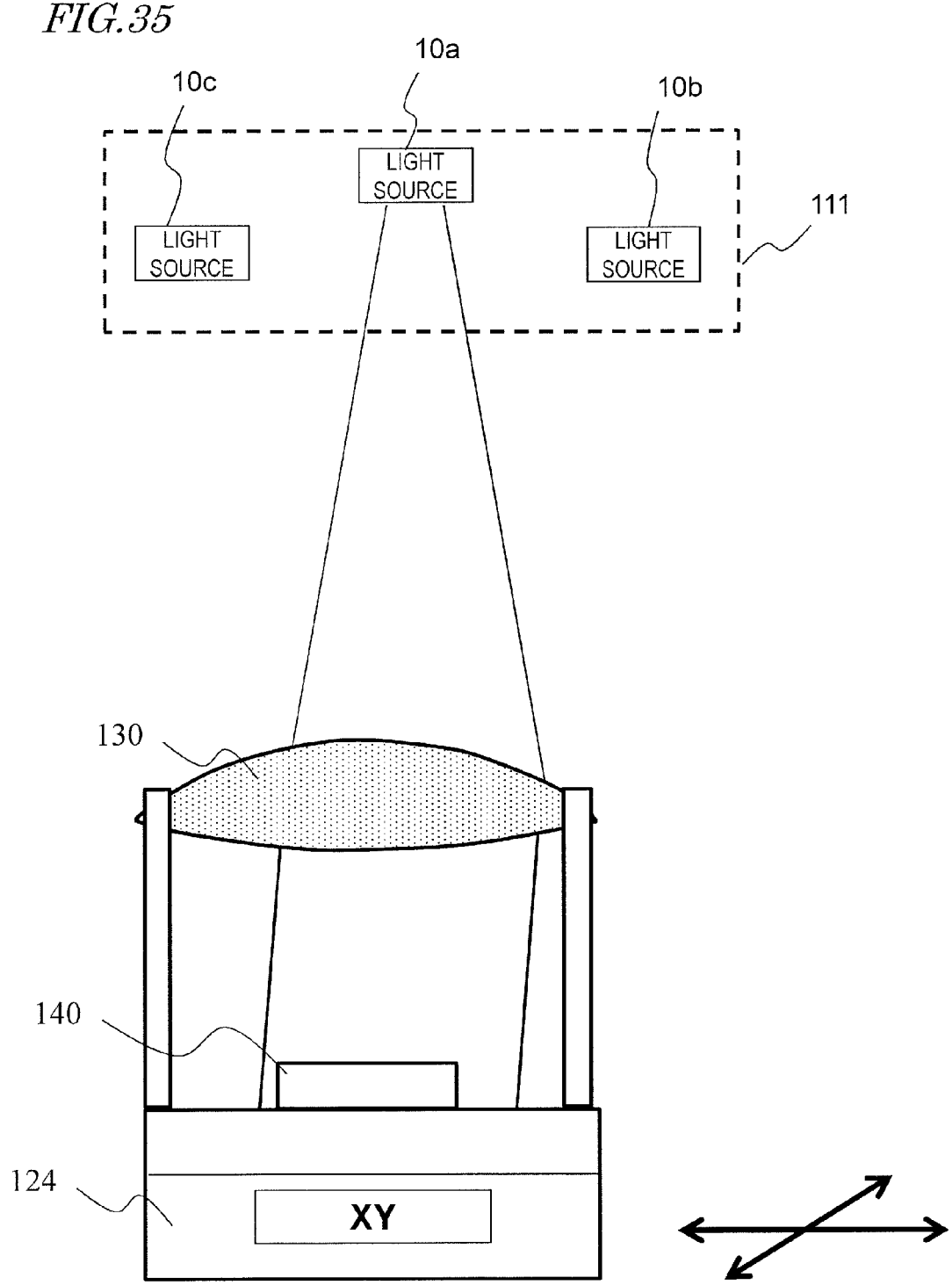
FIG. 35 illustrates yet another modified example with a holder which holds an object of shooting and an image sensor in an attachable and removable state.
Figure 36:
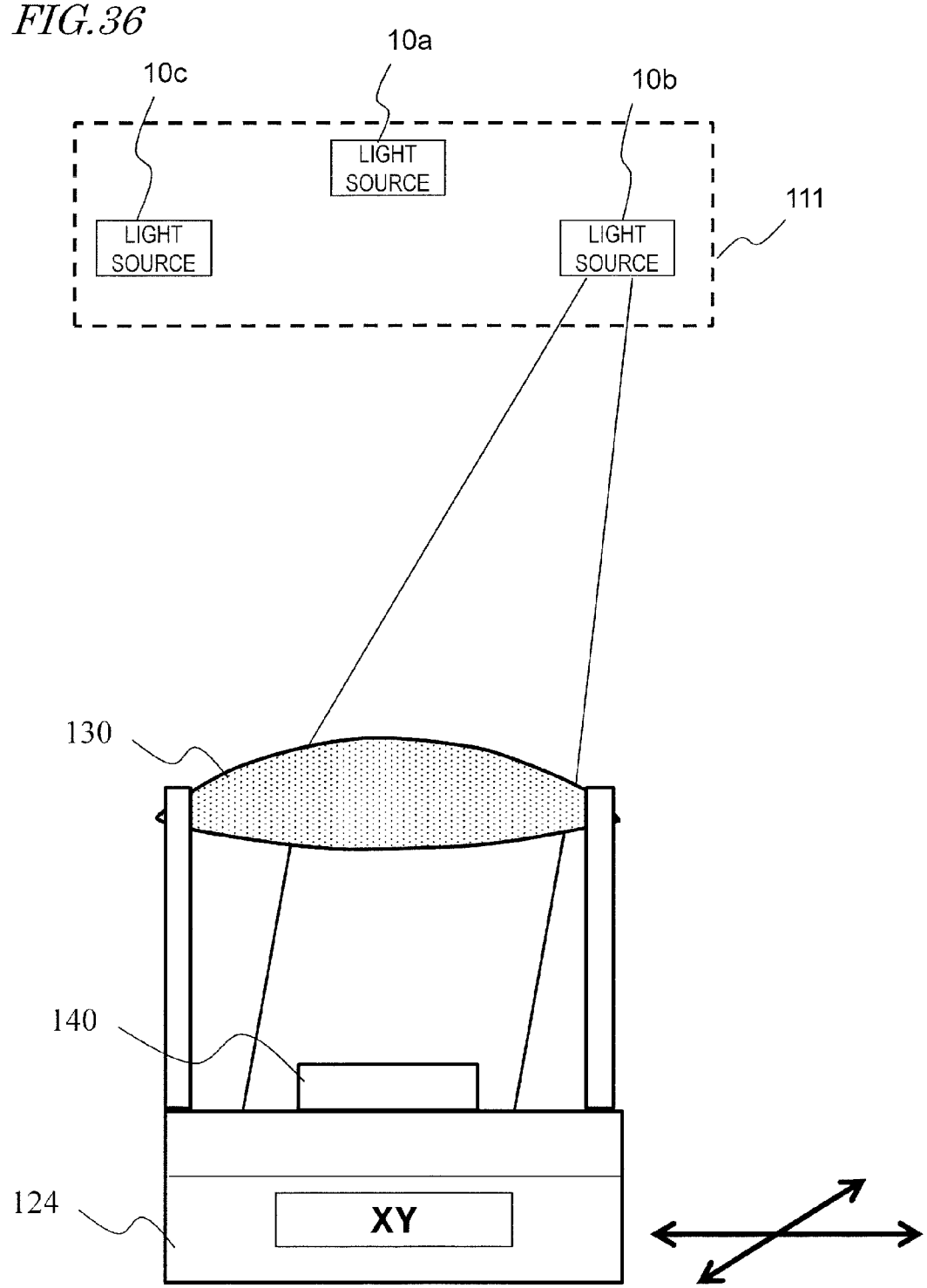
FIG. 36 illustrates yet another modified example with a holder which holds an object of shooting and an image sensor in an attachable and removable state.
Figure 37:
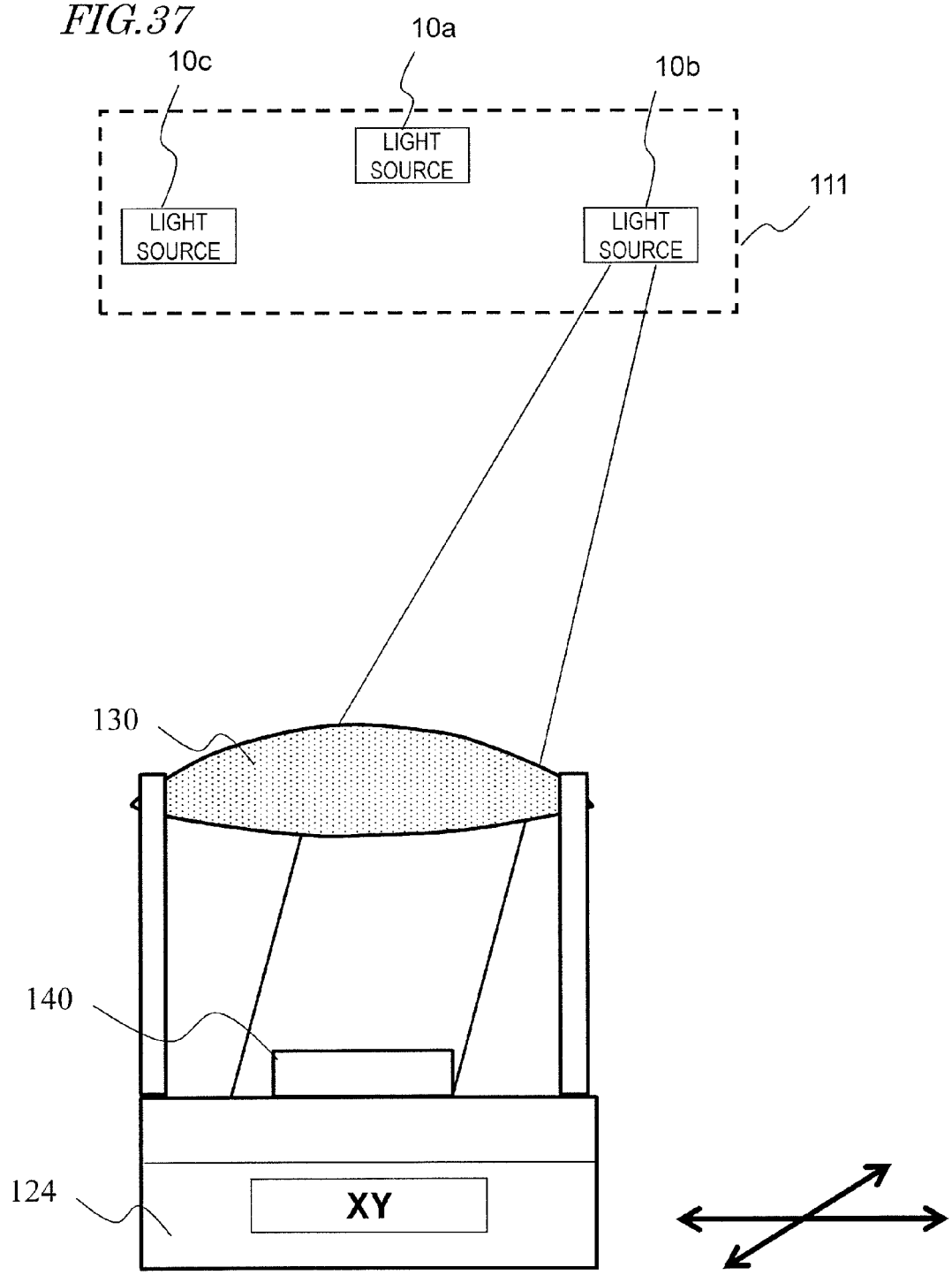
FIG. 37 illustrates yet another modified example with a holder which holds an object of shooting and an image sensor in an attachable and removable state.

FIG. 32 illustrates how an illuminating light beam is incident obliquely onto the object of shooting 140 which has moved a predetermined distance in a specified direction within a horizontal plane. Even if the position of the light source 10a is fixed, the irradiation direction of the illuminating light beam can also be controlled by adjusting the position of the object of shooting 140. Alternatively, the image forming apparatus of this modified example may include a plurality of light sources as shown in FIG. 33. If a plurality of light sources 10a, 10b and 10c are provided as shown in FIG. 33, then the mechanism to move the object of shooting 140 may be omitted or an XY moving mechanism (moving stage) 124 may be provided as shown in FIG. 34. By changing the position of the light source 10a, 10b, 10c to turn ON and/or the position of the object of shooting 140 as shown in FIGS. 36 and 37, an illuminating light beam can be made incident on the object of shooting 140 at any intended angle of incidence.

Figure 38:
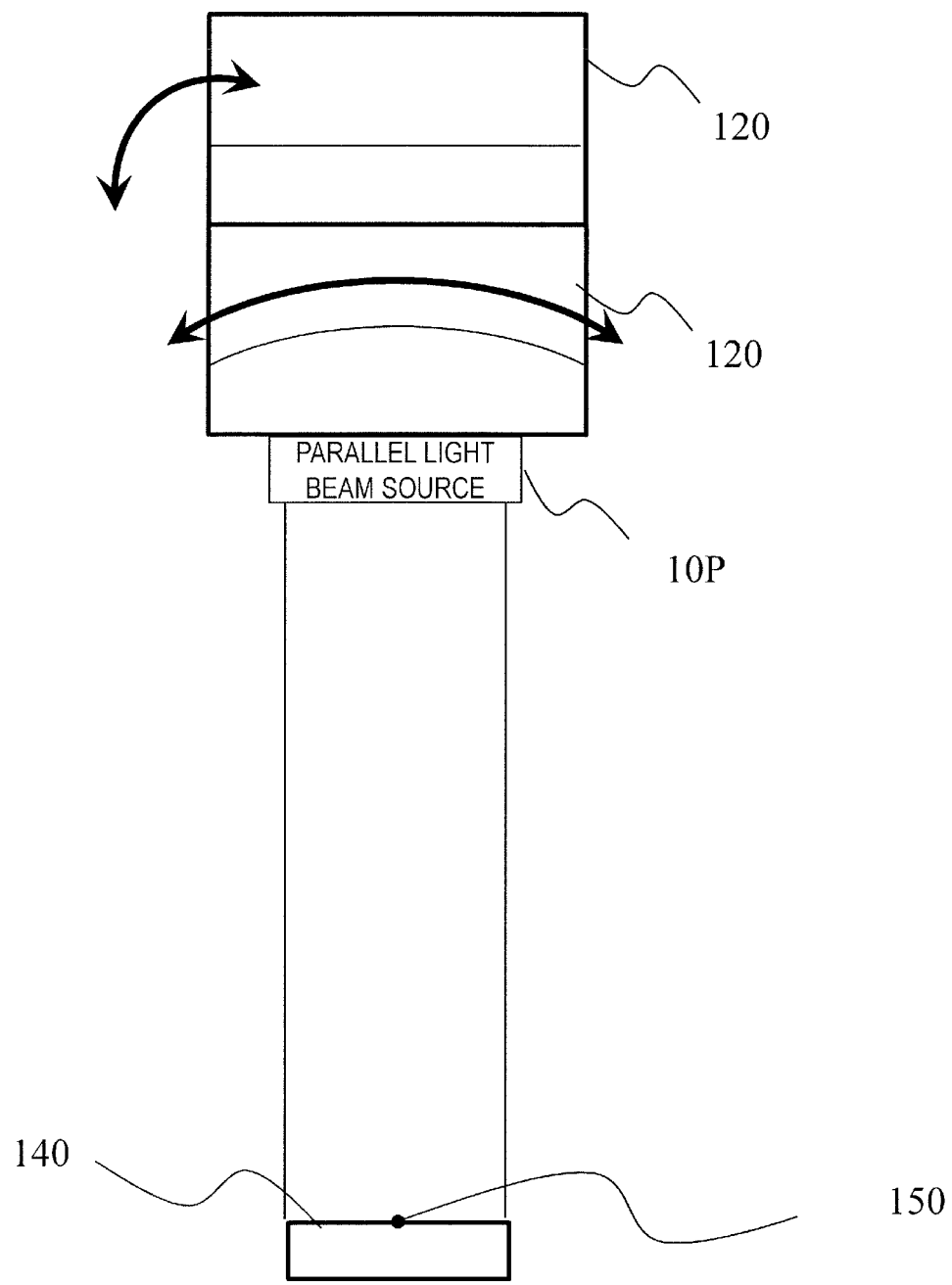
FIG. 38 illustrates yet another modified example with a holder which holds an object of shooting and an image sensor in an attachable and removable state.
Figure 39:
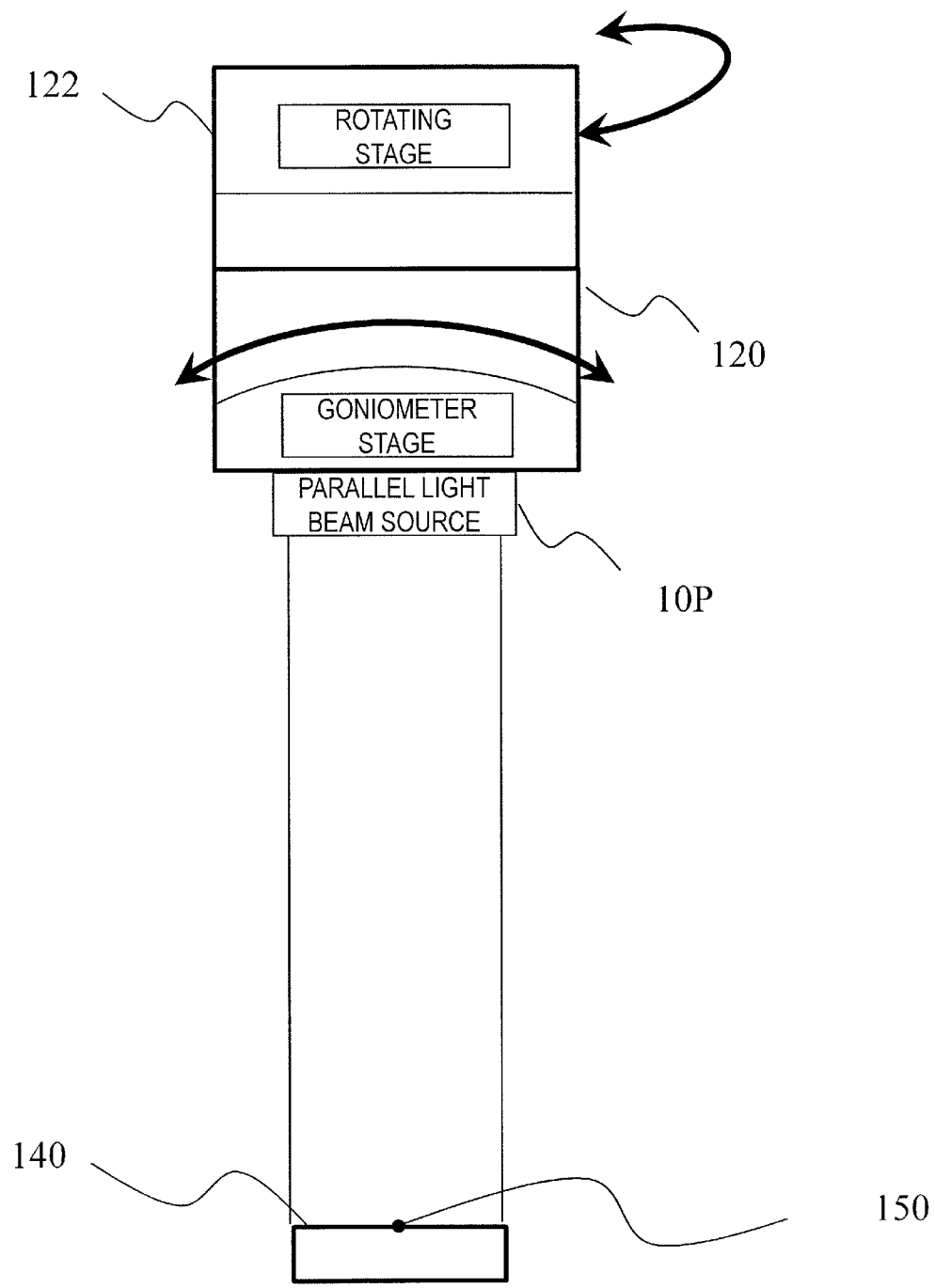
FIG. 39 illustrates yet another modified example with a holder which holds an object of shooting and an image sensor in an attachable and removable state.

FIG. 38 illustrates schematically a configuration for a modified example in which two gonio systems 120 support a parallel light beam source 10P. FIG. 39 illustrates schematically a configuration for a modified example in which a gonio system 120 and a rotating mechanism 122 support a parallel light beam source 10P.

In these modified examples, either a light source which emits a parallel light beam or an optical system which increases the degree of parallelism of the light emitted from a light source is used. However, these are just examples of embodiments of the present disclosure. As described above, if the distance from the light source to the object is sufficiently long, light which can be regarded as a substantially parallel light beam will be incident on the object.

In an embodiment of the present disclosure, within the imaging surface, the vertical size of each photodiode is expressed as 1/s of that of its associated pixel region, and the horizontal size of that photodiode is expressed as 1/t of that of the pixel region, where s and t are both real numbers and do not have to be integers. The aperture ratio is given by $(1/s) \times (1/t)$. In an embodiment of the present disclosure, the object may be irradiated with illuminating light beams in respective irradiation directions in which a different angles of irradiation are defined with respect to the vertical direction in the imaging surface, and images may be captured in those directions, respectively. Also, the object may be irradiated with illuminating light beams in respective irradiation directions in which b different angles of irradiation are defined with respect to the horizontal direction in the imaging surface, and images may be captured in those directions, respectively. In this case, a and b are integers which satisfy a≥s and b≥t. According to an embodiment of the present disclosure, low-resolution images are captured on a "a×b" basis, and an image, of which the resolution has increased "a×b" fold, can be obtained based on these low-resolution images. It should be noted that the product of $(1/s) \times (1/t)$ representing the image sensor's aperture ratio and a×b becomes equal to or greater than one.

An image forming apparatus according to the present disclosure may include an illumination system with a tilting mechanism which tilts the object and the image sensor together. In that case, even if the light source's position is fixed, the irradiation direction with respect to the object can be changed by getting the object and the image sensor rotated by the tilting mechanism. Such an illumination system can sequentially emit illuminating light beams from multiple different irradiation directions with respect to the object by tilting the object and the image sensor together.

An image forming method according to an aspect of the present disclosure includes the steps of: sequentially emitting illuminating light beams from multiple different irradiation directions with respect to an object and irradiating the object with the illuminating light beams; capturing a plurality of different images in the multiple different irradiation directions, respectively, using an imaging device which is arranged at a position where the illuminating light beams that have been transmitted through the object are incident; and forming a high-resolution image of the object, having a higher resolution than any of the plurality of images, based on the plurality of images.

Also, an image forming apparatus according to the present disclosure may include the illumination unit and image sensor described above and a general-purpose computer. The computer may be set up to: make the illumination unit sequentially emit illuminating light beams from multiple different irradiation directions with respect to an object and irradiate the object with the illuminating light beams; capture a plurality of different images in the multiple different irradiation directions, respectively, using an imaging device which is arranged at a position where the illuminating light beams that have been transmitted through the object are incident; and form a high-resolution image of the object, having a higher resolution than any of the plurality of images, based on the plurality of images. Such an operation may be performed in accordance with a computer program which is stored on a storage medium.

If a light source which irradiates the object with light and of which the orientation and position are fixed is used and if a tilting mechanism which tilts the object at multiple tilt angles is provided, an image sensor which is arranged at a position where the light that has been transmitted through the object is incident and the object can get tilted together by the tilting mechanism, and a plurality of images can be captured at the multiple tilt angles.

An image forming apparatus as one implementation of the present disclosure comprises: an illumination system which sequentially emits illuminating light beams from multiple different irradiation directions with respect to an object and irradiates the object with the illuminating light beams; an image sensor which is arranged at a position where the illuminating light beams that have been transmitted through the object are incident and which captures a plurality of different images in the multiple different irradiation directions, respectively; an image processing section which forms a high-resolution image of the object, having a higher resolution than any of the plurality of images, based on the plurality of images; and a memory which stores data about the ratio of light rays that have been incident on a photoelectric conversion section of each pixel of the image sensor to light rays that have passed through the upper surface of a plurality of subpixels included in the pixel with respect to each of the multiple irradiation directions, wherein the image processing section forms the high-resolution image of the object based on the data that has been retrieved from the memory by extracting, as a vector, a set of pixel values associated with the multiple irradiation directions from pixel values that form each of the plurality of images.

In one embodiment, the image processing section forms the high-resolution image of the object by multiplying the inverse matrix of a matrix having the ratio as its element by the vector of the pixel values based on the data that has been retrieved from the memory by extracting, as a vector, a set of pixel values associated with the multiple irradiation directions from pixel values that form each of the plurality of images.

In one embodiment, the image processing section forms the high-resolution image of the object by performing super-resolution processing using, as a vector, a set of pixel values that are associated with the multiple irradiation directions and that have been extracted from pixel values that form each of the plurality of images.

In one embodiment, the object is arranged close to the image sensor, and the object and the image sensor face each other with no lenses interposed between them.

In one embodiment, the interval between the image sensor's imaging surface and the object is equal to or shorter than 100 µm.

In one embodiment, each of the plurality of images includes images representing respectively different portions of the object.

In one embodiment, the object is fixed onto the image sensor, and the apparatus includes a holder which holds the image sensor in an attachable and removable state.

In one embodiment, supposing a and b are integers which are equal to or greater than two, the illuminating light beams are made to be incident on the object from different irradiation directions so that a different angles of irradiation are defined with respect to a vertical direction within the imaging surface of the image sensor, and images are captured in those irradiation directions, the illuminating light beams are made to be incident on the object from different irradiation directions so that b different angles of irradiation are defined with respect to a horizontal direction within the imaging surface, and images are captured in those irradiation directions, and the product of the aperture ratio of the image sensor and a×b becomes equal to or greater than one.

In one embodiment, the illumination system is able to emit light beams falling within respectively different wavelength ranges.

In one embodiment, the illumination system includes a light source which sequentially moves to multiple different positions corresponding to the multiple different irradiation directions and emits the illuminating light beams from those positions one after another.

In one embodiment, the illumination system includes a plurality of light sources which are arranged at multiple different positions corresponding to the multiple different irradiation directions and emit the illuminating light beams sequentially.

In one embodiment, the illumination system includes a tilting mechanism which tilts the object and the image sensor together, and by tilting the object and the image sensor together, the illumination system sequentially emits illuminating light beams from multiple different irradiation directions with respect to the object and irradiates the object with the illuminating light beams.

In one embodiment, the illumination system includes a mechanism which changes at least one of the object's orientation and position.

In one embodiment, the mechanism includes at least one of a gonio system and a moving stage.

In one embodiment, the mechanism includes an optical system which increases the degree of parallelism of the illuminating light beam.

In one embodiment, the illumination system includes an optical system which increases the degree of parallelism of the illuminating light beam.

An image forming method as another implementation of the present disclosure comprises the steps of: sequentially emitting illuminating light beams from multiple different irradiation directions with respect to an object and irradiating the object with the illuminating light beams; capturing a plurality of different images in the multiple different irradiation directions, respectively, using an imaging device which is arranged at a position where the illuminating light beams that have been transmitted through the object are incident; forming a high-resolution image of the object, having a higher resolution than any of the plurality of images, based on the plurality of images; and storing in a memory data about the ratio of light rays that have been incident on a photoelectric conversion section of each pixel of the image sensor to light rays that have passed through the upper surface of a plurality of subpixels included in the pixel with respect to each of the multiple irradiation directions, wherein the step of forming a high-resolution image of the object includes the step of forming the high-resolution image of the object by multiplying the inverse matrix of a matrix having the ratio as its element by the vector of the pixel values based on the data that has been retrieved from the memory by extracting, as a vector, a set of pixel values associated with the multiple irradiation directions from pixel values that form each of the plurality of images.

An image forming apparatus as still another implementation of the present disclosure comprises an illumination unit, an image sensor and a computer, wherein the computer is operative to: make the illumination unit sequentially emit illuminating light beams from multiple different irradiation directions with respect to an object and irradiate the object with the illuminating light beams; capture a plurality of different images in the multiple different irradiation directions, respectively, using the image sensor which is arranged at a position where the illuminating light beams that have been transmitted through the object are incident; form a high-resolution image of the object, having a higher resolution than any of the plurality of images, based on the plurality of images; and store in a memory data about the ratio of light rays that have been incident on a photoelectric conversion section of each pixel of the image sensor to light rays that have passed through the upper surface of a plurality of subpixels included in the pixel with respect to each of the multiple irradiation directions, wherein the computer is designed to form the high-resolution image of the object by multiplying the inverse matrix of a matrix having the ratio as its element by the vector of the pixel values based on the data that has been retrieved from the memory by extracting, as a vector, a set of pixel values associated with the multiple irradiation directions from pixel values that form each of the plurality of images.

Yet another implementation of the present disclosure is a program to be used by an image forming apparatus including an illumination unit, an image sensor and a computer, wherein the program is set up to: make the illumination unit sequentially emit illuminating light beams from multiple different irradiation directions with respect to an object and irradiate the object with the illuminating light beams; capture a plurality of different images in the multiple different irradiation directions, respectively, using the image sensor which is arranged at a position where the illuminating light beams that have been transmitted through the object are incident; form a high-resolution image of the object, having a higher resolution than any of the plurality of images, based on the plurality of images; and store in a memory data about the ratio of light rays that have been incident on a photoelectric conversion section of each pixel of the image sensor to light rays that have passed through the upper surface of a plurality of subpixels included in the pixel with respect to each of the multiple irradiation directions, wherein the program is set up to form the high-resolution image of the object by multiplying the inverse matrix of a matrix having the ratio as its element by the vector of the pixel values based on the data that has been retrieved from the memory by extracting, as a vector, a set of pixel values associated with the multiple irradiation directions from pixel values that form each of the plurality of images.

An image forming apparatus as yet another implementation of the present disclosure comprises: an illumination system which sequentially emits illuminating light beams from multiple different irradiation directions, of which the number is larger than $n^2$ (where n is an integer that is equal to or greater than two), with respect to an object and irradiates the object with the illuminating light beams; an image sensor which is arranged at a position where the illuminating light beams that have been transmitted through the object are incident and which captures a plurality of different images in the multiple different irradiation directions, respectively; an image processing section which forms a high-resolution image of the object, of which the resolution is n times as high as that of any of the plurality of images, based on the plurality of images; and a memory which stores data about the ratio of light rays that have been incident on a photoelectric conversion section of each pixel of the image sensor to light rays that have passed through the upper surface of a plurality of subpixels included in the pixel with respect to each of the multiple irradiation directions, wherein the image processing section forms the high-resolution image of the object by multiplying the inverse matrix of a matrix having the ratio as its element by the vector of the pixel values based on the data that has been retrieved from the memory by extracting, as a vector, a set of pixel values associated with the multiple irradiation directions from pixel values that form each of the plurality of images.

In one embodiment, every time the high-resolution image is formed, the image forming apparatus is able to calibrate automatically, without using a mosaic color filter for calibration, the data about the ratio of light rays to be incident on the photoelectric conversion section of each pixel of the image sensor to light rays that have passed through the upper surface of a plurality of subpixels included in the pixel with respect to each of the multiple irradiation directions.

In one embodiment, the illumination system is able to emit light beams falling within respectively different wavelength ranges.

In one embodiment, the illumination system includes a light source which sequentially moves to multiple different positions corresponding to the multiple different irradiation directions and emits the illuminating light beams from those positions one after another.

In one embodiment, the illumination system includes a plurality of light sources which are arranged at multiple different positions corresponding to the multiple different irradiation directions and emit the illuminating light beams sequentially.

In one embodiment, the illumination system includes a tilting mechanism which tilts the object and the image sensor together, and by tilting the object and the image sensor together, the illumination system sequentially emits illuminating light beams from multiple different irradiation directions with respect to the object and irradiates the object with the illuminating light beams.

An image forming method as yet another implementation of the present disclosure comprises: sequentially emitting illuminating light beams from multiple different irradiation directions, of which the number is larger than $n^2$ (where n is an integer that is equal to or greater than two), with respect to an object and irradiating the object with the illuminating light beams; capturing a plurality of different images in the multiple different irradiation directions, respectively, using an image sensor which is arranged at a position where the illuminating light beams that have been transmitted through the object are incident; forming a high-resolution image of the object, of which the resolution is n times as high as that of any of the plurality of images, based on the plurality of images; and storing in a memory data about the ratio of light rays that have been incident on a photoelectric conversion section of each pixel of the image sensor to light rays that have passed through the upper surface of a plurality of subpixels included in the pixel with respect to each of the multiple irradiation directions, wherein the method is designed to form the high-resolution image of the object by multiplying the inverse matrix of a matrix having the ratio as its element by the vector of the pixel values based on the data that has been retrieved from the memory by extracting, as a vector, a set of pixel values associated with the multiple irradiation directions from pixel values that form each of the plurality of images.

An image forming apparatus as yet another implementation of the present disclosure comprises an illumination unit, an image sensor and a computer, wherein the computer is operative to: make the illumination unit sequentially emit illuminating light beams from multiple different irradiation directions, of which the number is larger than $n^2$ (where n is an integer that is equal to or greater than two), with respect to an object and irradiate the object with the illuminating light beams; capture a plurality of different images in the multiple different irradiation directions, respectively, using the image sensor which is arranged at a position where the illuminating light beams that have been transmitted through the object are incident; form a high-resolution image of the object, of which the resolution is n times as high as that of any of the plurality of images, based on the plurality of images; and store in a memory data about the ratio of light rays that have been incident on a photoelectric conversion section of each pixel of the image sensor to light rays that have passed through the upper surface of a plurality of subpixels included in the pixel with respect to each of the multiple irradiation directions, wherein the computer is designed to form the high-resolution image of the object by multiplying the inverse matrix of a matrix having the ratio as its element by the vector of the pixel values based on the data that has been retrieved from the memory by extracting, as a vector, a set of pixel values associated with the multiple irradiation directions from pixel values that form each of the plurality of images.

Yet another implementation of the present disclosure is a program to be used by an image forming apparatus including an illumination unit, an image sensor and a computer, wherein the program is set up to: make the illumination unit sequentially emit illuminating light beams from multiple different irradiation directions, of which the number is larger than $n^2$ (where n is an integer that is equal to or greater than two), with respect to an object and irradiate the object with the illuminating light beams; capture a plurality of different images in the multiple different irradiation directions, respectively, using the image sensor which is arranged at a position where the illuminating light beams that have been transmitted through the object are incident; form a high-resolution image of the object, of which the resolution is n times as high as that of any of the plurality of images, based on the plurality of images; and store in a memory data about the ratio of light rays that have been incident on a photoelectric conversion section of each pixel of the image sensor to light rays that have passed through the upper surface of a plurality of subpixels included in the pixel with respect to each of the multiple irradiation directions, wherein the program is set up to form the high-resolution image of the object by multiplying the inverse matrix of a matrix having the ratio as its element by the vector of the pixel values based on the data that has been retrieved from the memory by extracting, as a vector, a set of pixel values associated with the multiple irradiation directions from pixel values that form each of the plurality of images.

An image forming apparatus as yet another implementation of the present disclosure comprises: a light source which irradiates an object with light and of which the orientation and position are fixed; a tilting mechanism which tilts the object at multiple tilt angles; an image sensor which is arranged at a position where the light that has been transmitted through the object is incident, gets tilted along with the object by the tilting mechanism, and captures a plurality of different images at the multiple tilt angles; an image processing section which forms a high-resolution image of the object, having a higher resolution than any of the plurality of images, based on the plurality of images; and a memory which stores data about the ratio of light rays that have been incident on a photoelectric conversion section of each pixel of the image sensor to light rays that have passed through the upper surface of a plurality of subpixels included in the pixel with respect to each of the multiple tilt angles, wherein the image processing section forms the high-resolution image of the object based on the data that has been retrieved from the memory by extracting, as a vector, a set of pixel values associated with the multiple tilt angles from pixel values that form each of the plurality of images.

In one embodiment, the object is arranged close to the image sensor, and the object and the image sensor face each other with no lenses interposed between the object and the image sensor.

In one embodiment, the interval between an imaging surface of the image sensor and the object is equal to or shorter than 100 μm.

In one embodiment, each of the plurality of images includes images representing respectively different portions of the object.

In one embodiment, the object is fixed to the image sensor, and the image forming apparatus includes a holder which holds the image sensor in an attachable and removable state.

In one embodiment, the tilting mechanism includes at least one of a gonio system and a moving stage.

In one embodiment, the tilting mechanism includes an optical system which increases the degree of parallelism of the light.

In one embodiment, the light source includes an optical system which increases the degree of parallelism of the light.

An image forming method as yet another implementation of the present disclosure comprises: irradiating an object with illuminating light which has been emitted from a fixed light source while tilting the object at multiple tilt angles; capturing a plurality of different images at the multiple tilt angles using an image sensor which is arranged at a position where the illuminating light that has been transmitted through the object is incident; and forming a high-resolution image of the object, having a higher resolution than any of the plurality of images, by synthesizing the plurality of images together, wherein the high-resolution image of the object is formed based on data about the ratio of light rays that have been incident on a photoelectric conversion section of each pixel of the image sensor to light rays that have passed through the upper surface of a plurality of subpixels included in the pixel with respect to each of the multiple tilt angles.

Yet another implementation of the present disclosure is a program designed to make a computer perform: irradiating an object with illuminating light which has been emitted from a fixed light source while tilting the object at multiple tilt angles; capturing a plurality of different images at a multiple different irradiation directions using an image sensor which is arranged at a position where the illuminating light that has been transmitted through the object is incident; and forming a high-resolution image of the object, having a higher resolution than any of the plurality of images, by synthesizing the plurality of images together, wherein the high-resolution image of the object is formed based on data about the ratio of light rays that have been incident on a photoelectric conversion section of each pixel of the image sensor to light rays that have passed through the upper surface of a plurality of subpixels included in the pixel with respect to each of the multiple tilt angles.

Yet another implementation of the present disclosure is an image sensor for use in an image forming apparatus, the apparatus comprises: an illumination system which sequentially emits illuminating light beams from multiple different irradiation directions with respect to an object and irradiates the object with the illuminating light beams; a holder which holds the image sensor in an attachable and removable state; an image processing section which forms, based on a plurality of different images that have been captured by the image sensor in the multiple different irradiation directions, respectively, a high-resolution image of the object having a higher resolution than any of the plurality of images; and a memory which stores data about the ratio of light rays that have been incident on a photoelectric conversion section of each pixel of the image sensor to light rays that have passed through the upper surface of a plurality of subpixels included in the pixel with respect to each of the multiple irradiation directions, wherein the image processing section forms the high-resolution image of the object based on the data that has been retrieved from the memory by extracting, as a vector, a set of pixel values associated with the multiple irradiation directions from pixel values that form each of the plurality of images, the image sensor is arranged so as to be attachable to, and removable from, the image forming apparatus, the imaging surface of the image sensor has an object supporting portion which is a region on which the object is able to be mounted, and the image sensor is arranged at a position where the illuminating light beams transmitted through the object are incident while being held by the holder onto the image forming apparatus and captures the plurality of different images in the multiple different irradiation directions.

In one embodiment, the image sensor is arranged on slide glass, and held by the holder onto the image forming apparatus so as to be attachable to, and removable from, the apparatus via a portion of the slide glass.

In one embodiment, an opaque member is arranged on a side surface of the image sensor.

In one embodiment, an opaque region which limits an image capturing range is arranged on the object supporting portion.

An image forming apparatus, image forming method, image processing program and image sensor according to the present disclosure contributes to getting a high-resolution image with the trouble of adjusting the focus saved.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An image forming apparatus comprising:
   an illumination system which sequentially emits illuminating light beams from multiple different irradiation directions with respect to an object and irradiates the object with the illuminating light beams;
   an image sensor which is arranged at a position where the illuminating light beams that have been transmitted through the object are incident and which captures a plurality of different images in the multiple different irradiation directions, respectively;
   an image processing section which forms a high-resolution image of the object, having a higher resolution than any of the plurality of images, based on the plurality of images; and
   a memory which stores data about the ratio of light rays that have been incident on a photoelectric conversion section of each pixel of the image sensor to light rays that have passed through the upper surface of a plurality of subpixels included in the pixel with respect to each of the multiple irradiation directions,
   wherein the image processing section forms the high-resolution image of the object based on the data that has been retrieved from the memory by extracting, as a vector, a set of pixel values associated with the multiple irradiation directions from pixel values that form each of the plurality of images.

2. The image forming apparatus of claim 1, wherein the image processing section forms the high-resolution image of the object by multiplying the inverse matrix of a matrix having the ratio as its element by the vector of the pixel values based on the data that has been retrieved from the memory by extracting, as a vector, a set of pixel values associated with the multiple irradiation directions from pixel values that form each of the plurality of images.

3. The image forming apparatus of claim 1, wherein the image processing section forms the high-resolution image of the object by performing super-resolution processing using, as a vector, a set of pixel values that are associated with the multiple irradiation directions and that have been extracted from pixel values that form each of the plurality of images.

4. The image forming apparatus of claim 1, wherein the object is arranged close to the image sensor, and
   the object and the image sensor face each other with no lenses interposed between the object and the image sensor.

5. The image forming apparatus of claim 4, wherein the interval between an imaging surface of the image sensor and the object is equal to or shorter than 100 μm.

6. The image forming apparatus of claim 1, wherein each of the plurality of images includes images representing respectively different portions of the object.

7. The image forming apparatus of claim 1, wherein the object is fixed to the image sensor, and
the image forming apparatus includes a holder which holds the image sensor in an attachable and removable state.

8. The image forming apparatus of claim 1, wherein the illumination system is able to emit light beams falling within respectively different wavelength ranges.

9. The image forming apparatus of claim 1, wherein the illumination system includes a light source which sequentially moves to multiple different positions corresponding to the multiple different irradiation directions and emits the illuminating light beams from those positions one after another.

10. The image forming apparatus of claim 1, wherein the illumination system includes a plurality of light sources which are arranged at multiple different positions corresponding to the multiple different irradiation directions and emit the illuminating light beams sequentially.

11. The image forming apparatus of claim 1, wherein the illumination system includes a tilting mechanism which tilts the object and the image sensor together, and
by tilting the object and the image sensor together, the illumination system sequentially emits illuminating light beams from multiple different irradiation directions with respect to the object and irradiates the object with the illuminating light beams.

12. The image forming apparatus of claim 11, wherein the illumination system includes a mechanism which changes at least one of the object's orientation and position.

13. The image forming apparatus of claim 12, wherein the mechanism includes at least one of a gonio system and a moving stage.

14. The image forming apparatus of claim 12, wherein the mechanism includes an optical system which increases the degree of parallelism of the illuminating light beam.

15. The image forming apparatus of claim 11, wherein the illumination system includes an optical system which increases the degree of parallelism of the illuminating light beam.

16. An image forming method comprising:
sequentially emitting illuminating light beams from multiple different irradiation directions with respect to an object and irradiating the object with the illuminating light beams;
capturing a plurality of different images in the multiple different irradiation directions, respectively, using an image sensor which is arranged at a position where the illuminating light beams that have been transmitted through the object are incident;
forming a high-resolution image of the object, having a higher resolution than any of the plurality of images, based on the plurality of images; and
storing in a memory data about the ratio of light rays that have been incident on a photoelectric conversion section of each pixel of the image sensor to light rays that have passed through the upper surface of a plurality of subpixels included in the pixel with respect to each of the multiple irradiation directions,
wherein the forming a high-resolution image of the object includes the forming the high-resolution image of the object by multiplying the inverse matrix of a matrix having the ratio as its element by the vector of the pixel values based on the data that has been retrieved from the memory by extracting, as a vector, a set of pixel values associated with the multiple irradiation directions from pixel values that form each of the plurality of images.

17. An image sensor for use in an image forming apparatus, the image forming apparatus comprising: i) an illumination system which sequentially emits illuminating light beams from multiple different irradiation directions with respect to an object and irradiates the object with the illuminating light beams; ii) a holder which holds the image sensor in an attachable and removable state; iii) an image processing section which forms, based on a plurality of different images that have been captured by the image sensor in the multiple different irradiation directions, respectively, a high-resolution image of the object having a higher resolution than any of the plurality of images; and iv) a memory which stores data about the ratio of light rays that have been incident on a photoelectric conversion section of each pixel of the image sensor to light rays that have passed through the upper surface of a plurality of subpixels included in the pixel with respect to each of the multiple irradiation directions, the image processing section forming the high-resolution image of the object based on the data that has been retrieved from the memory by extracting, as a vector, a set of pixel values associated with the multiple irradiation directions from pixel values that form each of the plurality of images,
the image sensor being arranged attachably to, and removably from, the image forming apparatus,
an imaging surface of the image sensor has an object supporting portion which is a region on which the object is able to be mounted, and
the image sensor is arranged at a position where the illuminating light beams transmitted through the object are incident while being held by the holder onto the image forming apparatus and captures the plurality of different images in the multiple different irradiation directions.

18. The image sensor of claim 17, wherein the image sensor is arranged above slide glass, and held by the holder onto the image forming apparatus attachably to, and removably from, the image forming apparatus via a portion of the slide glass.

19. The image sensor of claim 17, wherein an opaque member is arranged on a side surface of the image sensor.

20. The image sensor of claim 17, wherein an opaque region which limits an image capturing range is arranged on the object supporting portion.

* * * * *